United States Patent [19]
Drake et al.

[11] Patent Number: 6,135,851
[45] Date of Patent: Oct. 24, 2000

[54] FOLDABLE TOY AND GAME

[75] Inventors: Luther E. Drake, Gilmanton, N.H.; Earl W. Duval, Lowell, Mass.

[73] Assignee: Big Kids, Inc., Lowell, Mass.

[21] Appl. No.: 09/248,927

[22] Filed: Feb. 12, 1999

[51] Int. Cl.[7] .............................. A63H 33/00; G09B 17/00
[52] U.S. Cl. ........................ 446/487; 273/243; 273/446; 434/160
[58] Field of Search .................................... 273/236, 242, 273/243, 276, 446; 434/160; 446/86, 113, 487

[56] References Cited

U.S. PATENT DOCUMENTS

| | | | |
|---|---|---|---|
| 1,541,004 | 6/1925 | Taylor | 446/113 X |
| 1,860,627 | 5/1932 | Sherman | 446/86 X |
| 2,496,810 | 2/1950 | Nerrie | 434/160 |
| 2,751,634 | 6/1956 | Washington | 446/487 |
| 3,315,376 | 4/1967 | Nielsen | 434/160 |
| 3,592,469 | 7/1971 | Glass et al. | 273/446 |
| 4,114,307 | 9/1978 | Liebeskind | 446/487 |
| 5,172,534 | 12/1992 | Milner et al. | 52/593 |

FOREIGN PATENT DOCUMENTS

| | | | |
|---|---|---|---|
| 535765 | 12/1958 | Belgium | 446/487 |
| 123615 | 3/1919 | United Kingdom | 434/160 |

OTHER PUBLICATIONS

Booklet entitled: "Rubik's Snake", *OddzOn Products, Inc.* 1995.
Before 1950—Wooden Carpenter's Ruler.

*Primary Examiner*—John A. Ricci
*Attorney, Agent, or Firm*—Patents & TMS, P.C.

[57] ABSTRACT

A foldable toy which can be selectively arranged into a plurality of desired shapes is disclosed as well as an associated game. The foldable toy includes a plurality of primary links, a plurality of joints connecting the primary links together, and a plurality of secondary links having first ends secured to the joints and having opposite free ends. The joints permit the primary and secondary links to be rotated about the joints through 360° in parallel planes in order to form different desired shapes. The foldable toy can advantageously form a virtually unlimited number of different shapes including, for example, each of the letters A through Z of the English-language alphabet, each of the numerals 0–9, and a plurality of common geometric shapes such as a square, triangle, rectangle, star, diamond, and octagon. The foldable toy can also be formed into other amusing shapes such as animals, rocket ships, buildings, etc. and numerous other shapes that a child can imagine. The foldable toy can also be used in combination with a game including a game board having a pathway displaying a number of different shapes. The game is played by having the players move game pieces along the pathway and making different shapes with the foldable toy when their game piece lands on the different shapes displayed on the pathway.

56 Claims, 16 Drawing Sheets

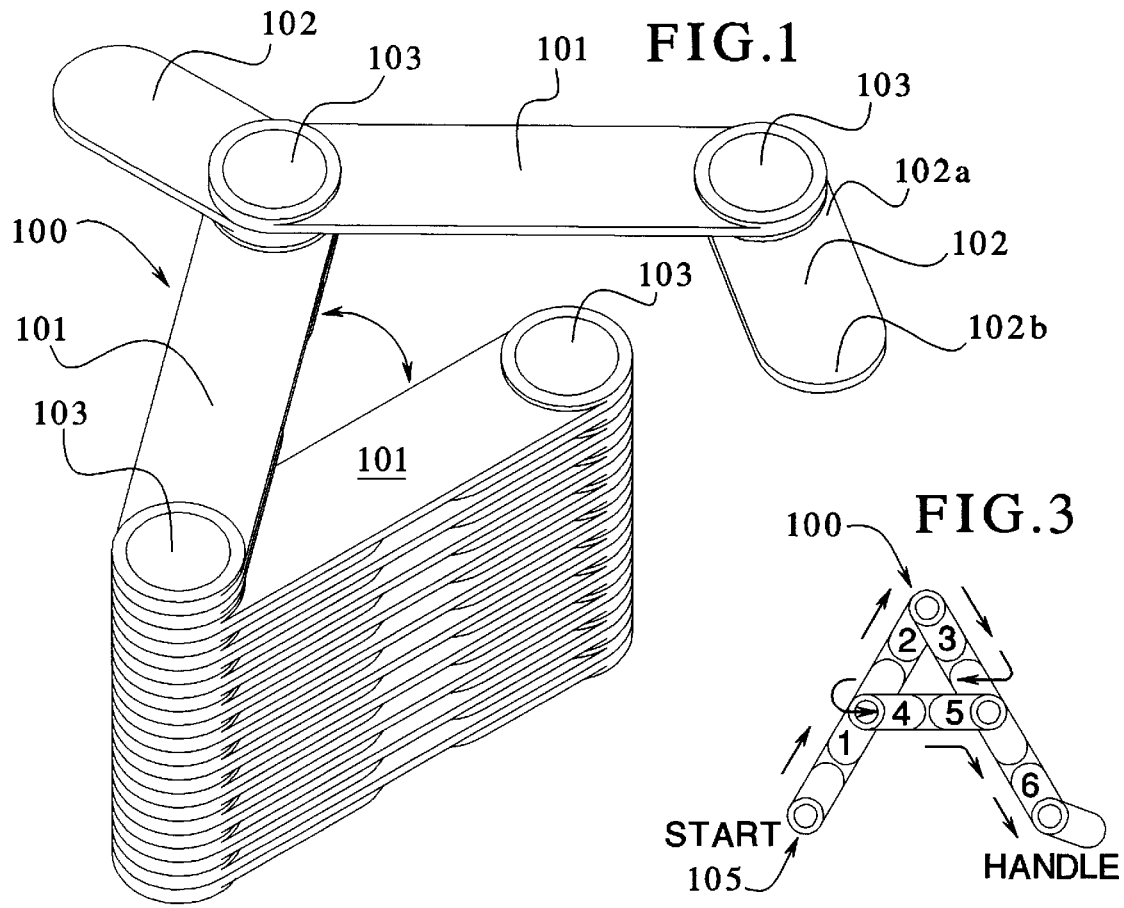
FIG.1
FIG.3
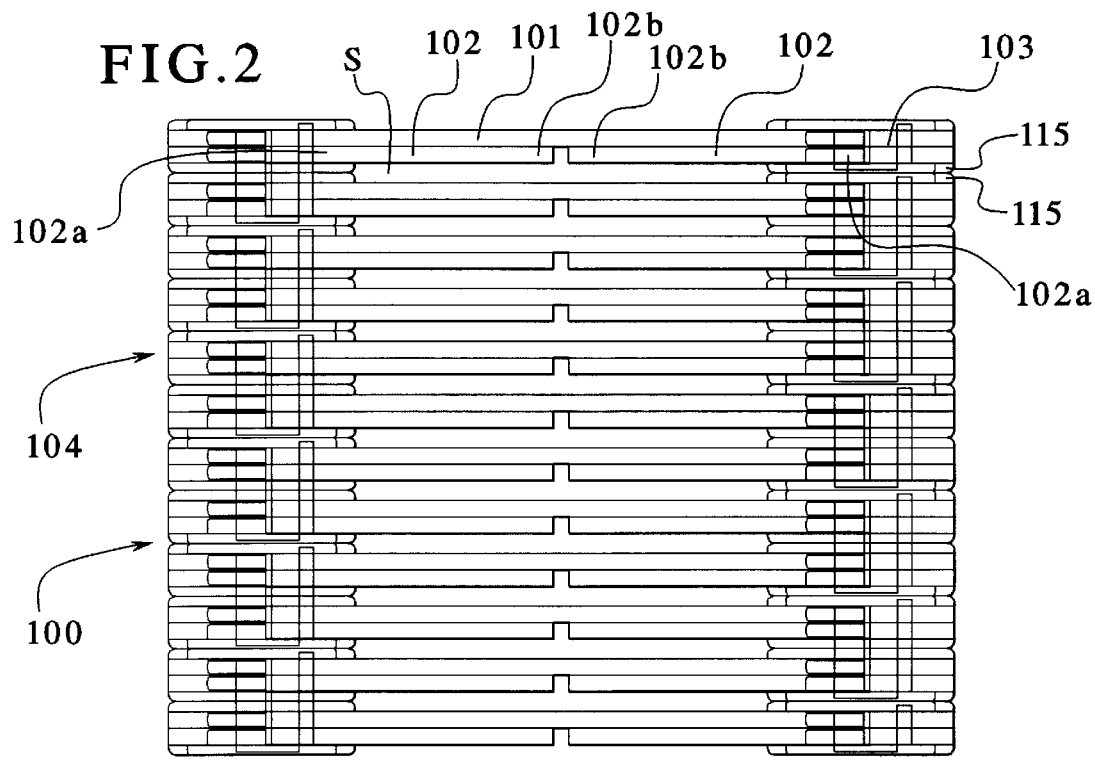
FIG.2

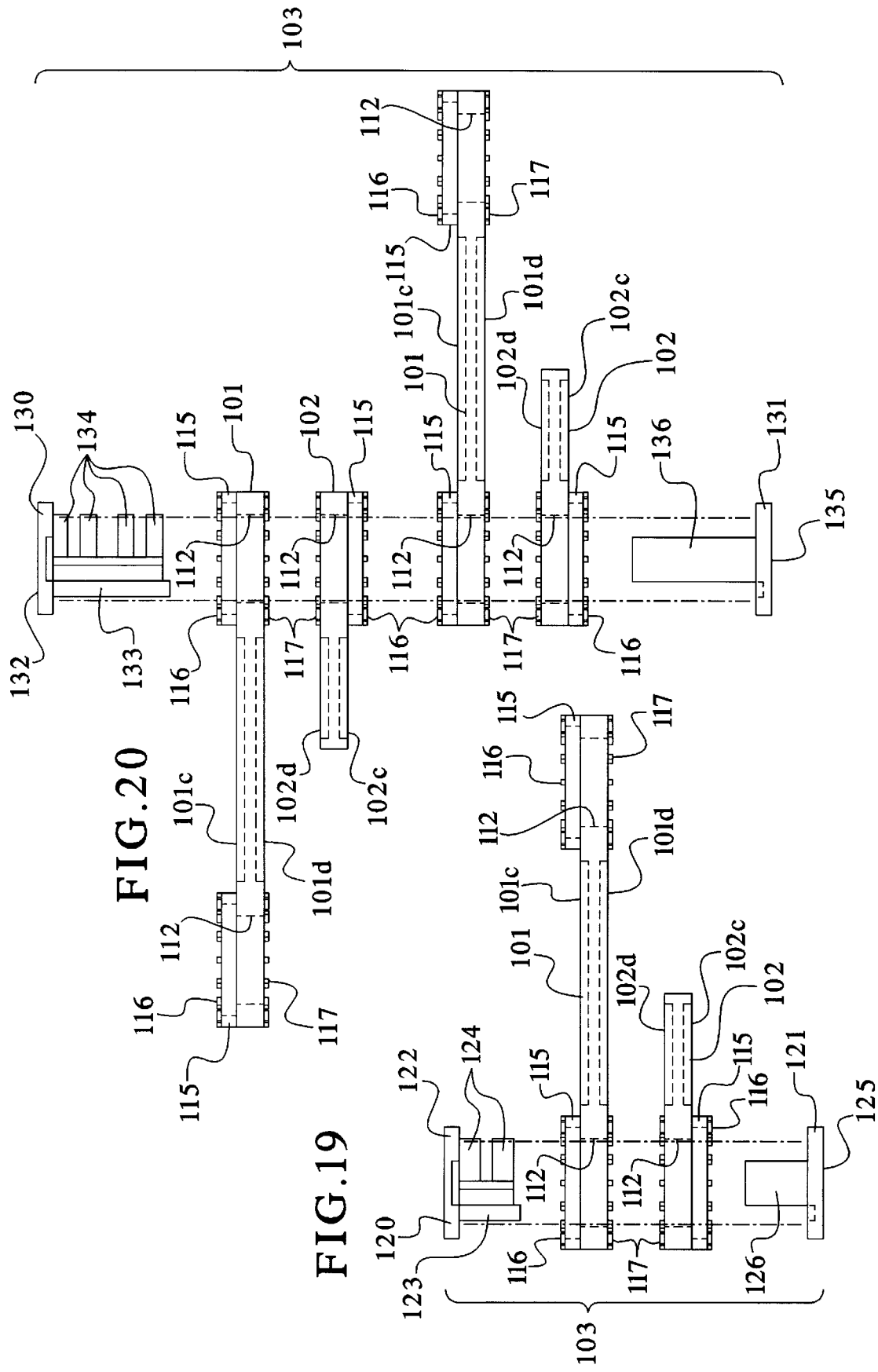

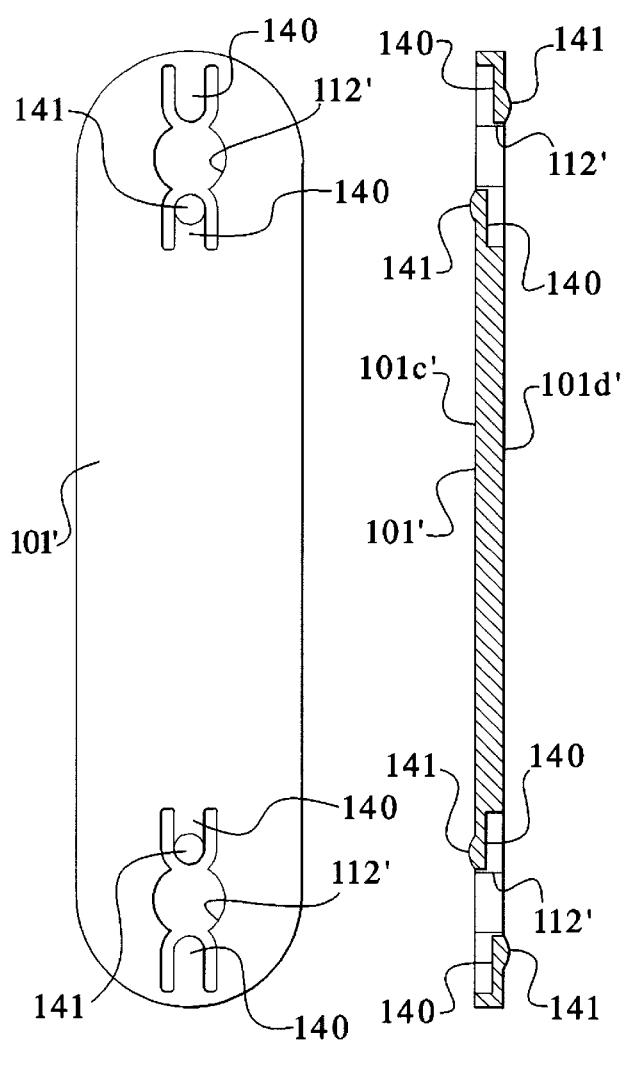
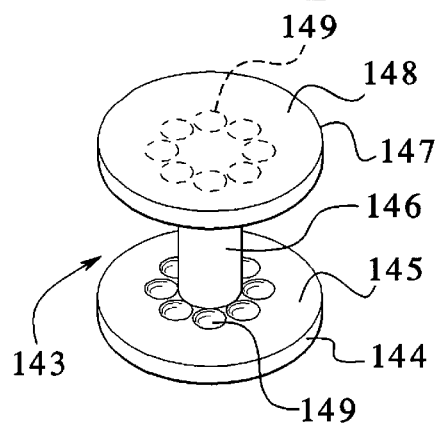
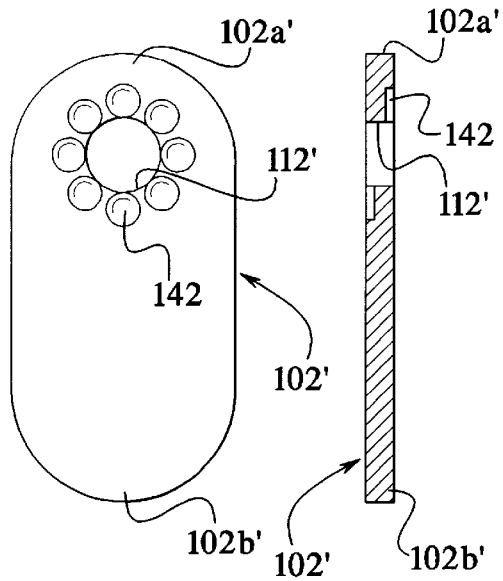
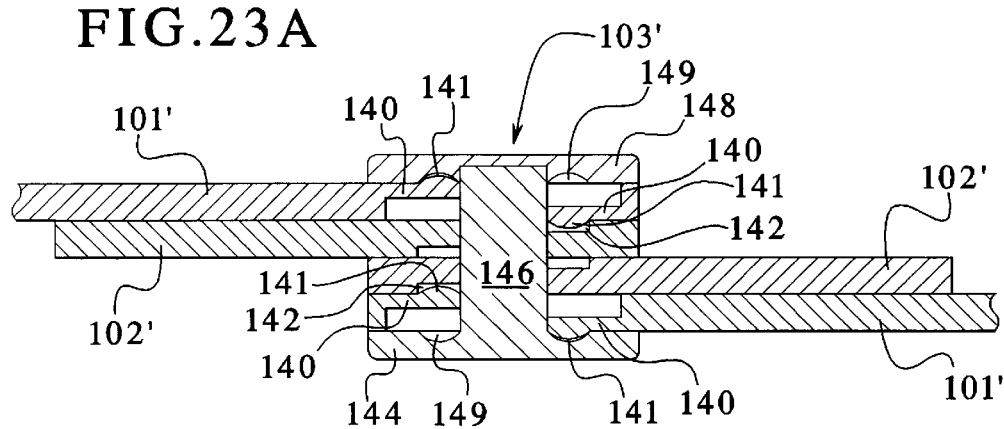

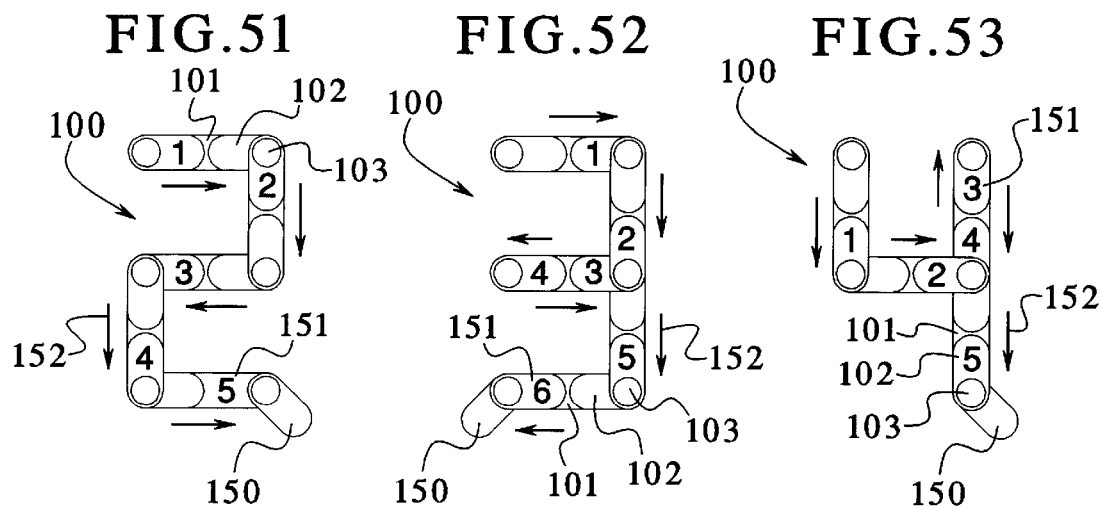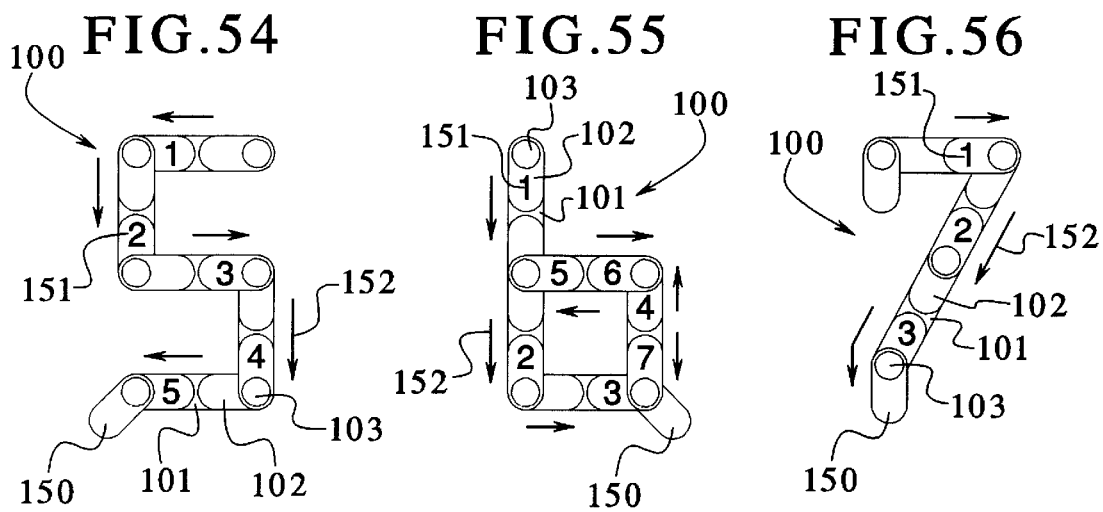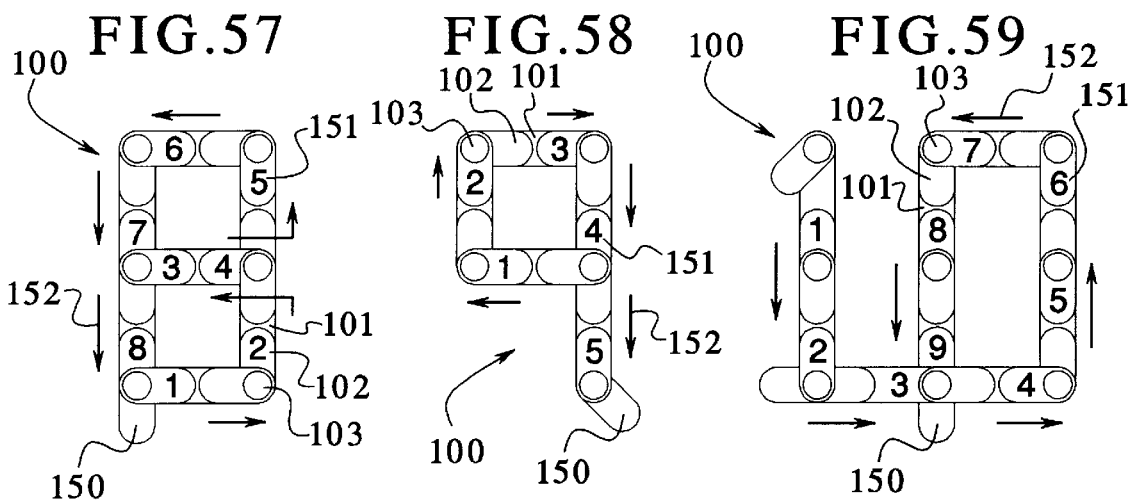

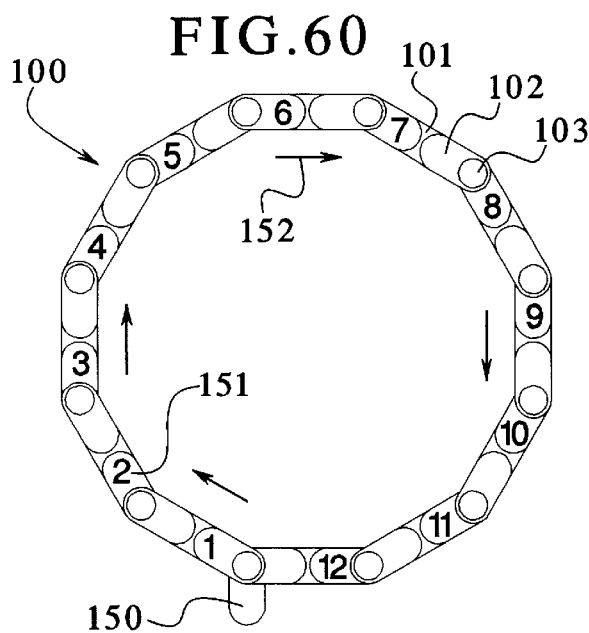
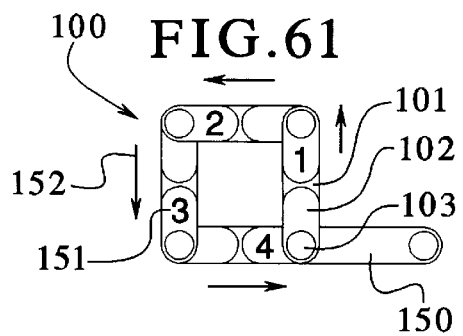
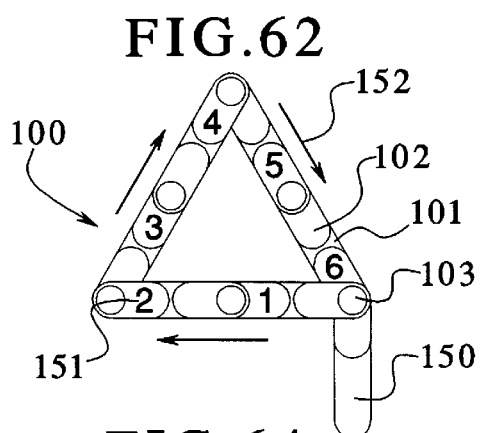
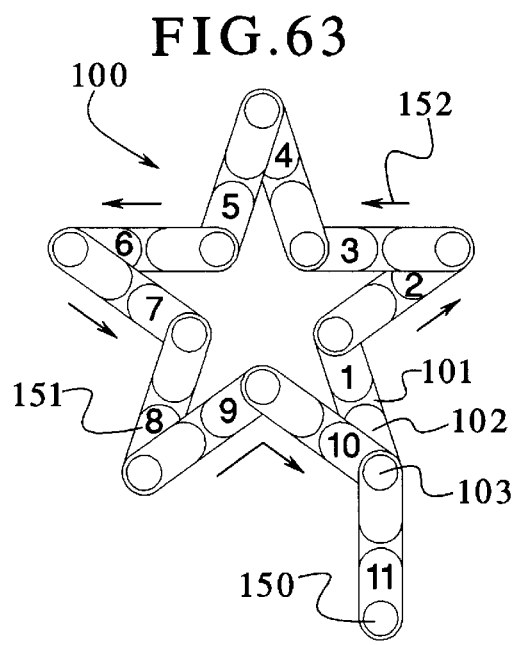
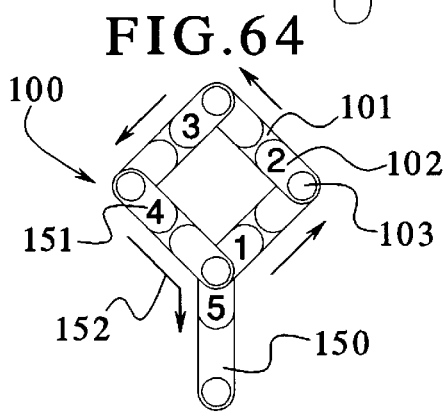
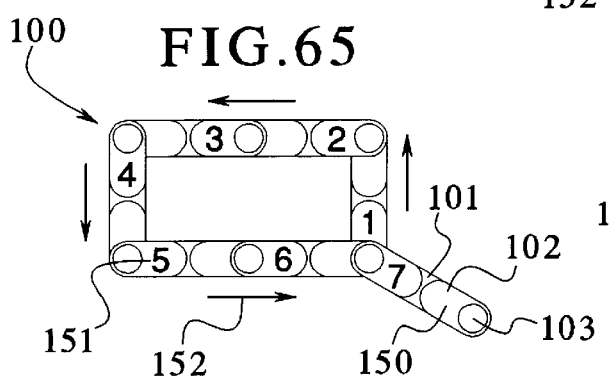
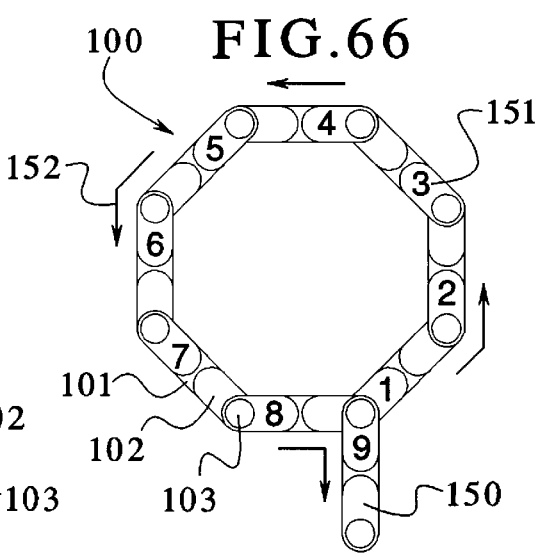

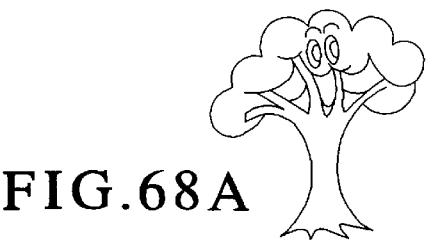
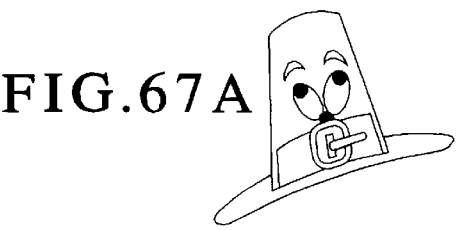
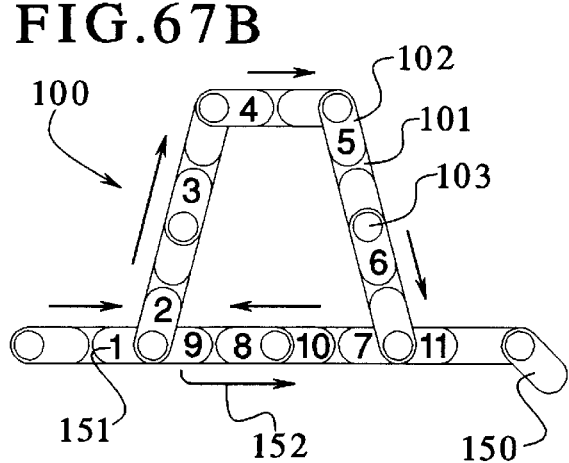
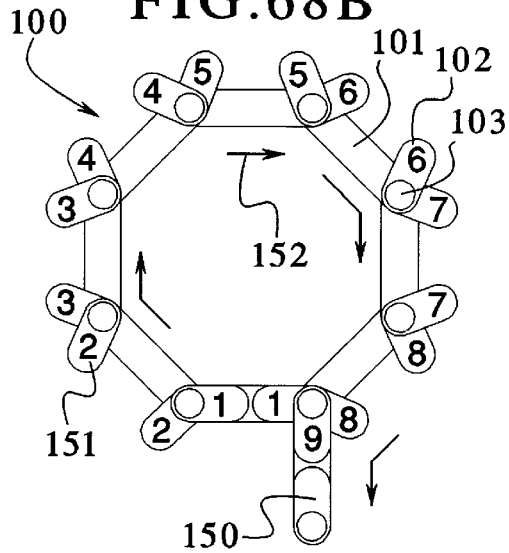
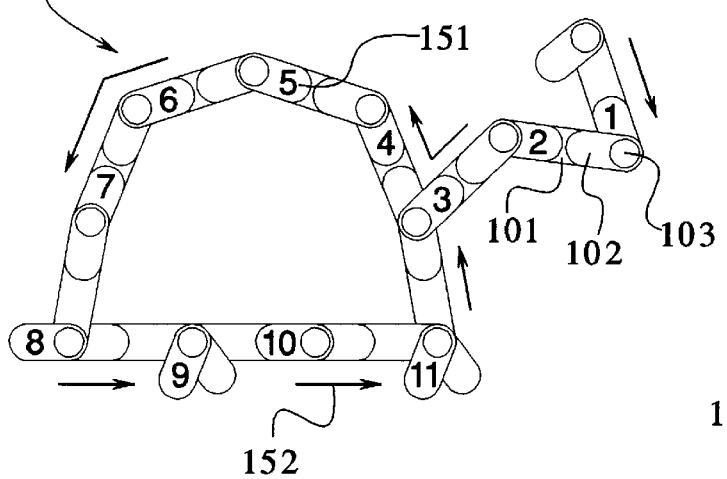
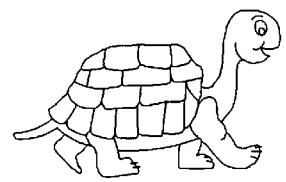
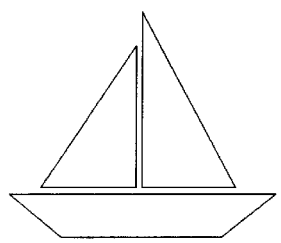
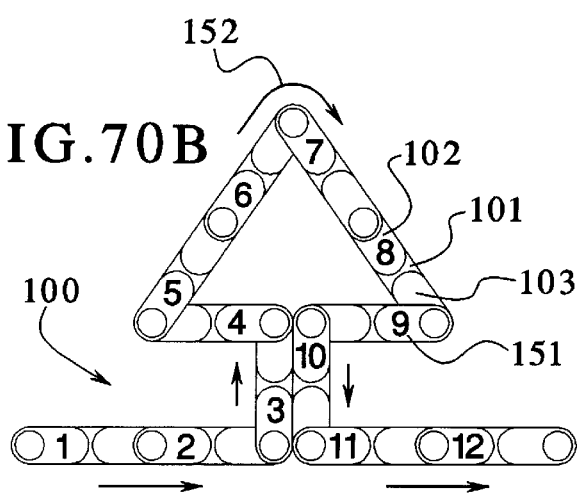

FOLDABLE TOY AND GAME

BACKGROUND AND SUMMARY

This invention relates to children's toys and games and more particularly to a children's toy and game that are enjoyable and entertaining while still contributing to a child's learning and development of a variety of skills.

Today's marketplace offers parents and their children thousands of choices in toys. Many toys that children find entertaining have limited, if any, educational qualities. On the other hand, many toys are specifically intended to foster a child's education and provide varying ranges of being successful at entertaining children. Thus, toy and game developers must often strike a balance between entertainment value and educational value.

Many educational toys are also limited to providing only a specific educational benefit, such as teaching the ability to identify colors or numbers. The limited nature of such toys can lead to the toy losing its entertainment value to children over time.

An important aspect of this invention therefore lies in providing a unique children's toy and game that are highly enjoyable and entertaining to children while still contributing to a child's learning and development of a variety of skills. Such results are achieved by providing a foldable toy for selectively constructing a plurality of desired shapes such as letters of the alphabet, numerals, common geometric shapes, animals, buildings, and any other of a variety of virtually infinite shapes that a child can imagine. The foldable toy can also be advantageously used in connection with a board game that requires players to make a variety of shapes throughout play of the game.

The foldable toy requires physical activity in order to construct a desired shape and thus aids in the development of the child's hand/eye coordination and fine motor skills. The ability to also easily construct a desired shape appeals to the child's sense of creativity and builds confidence in the child's ability to physically construct or create shapes in physical form.

The foldable toy also acts as a teaching tool because it can be formed into a plurality of common shapes associated with education. For example, while playing with the foldable toy, the child learns to identify and create letters of the alphabet, numerals, and common geometric shapes such as squares, rectangles, diamonds, etc. The foldable toy thus presents a highly enjoyable way to learn to identify and form those shapes, and this ability, once learned, can be translated to other skills such as writing and drawing.

In addition to traditional educational elements such as letters of the alphabet, numerals, and common geometric shapes, the foldable toy also permits the child to form other shapes such as animals, buildings, and other common objects. Again, the ability to identify, learn and form such shapes aids in the child's learning and development and can be translated to other skills such as writing and drawing.

While a wide variety of shapes that can be formed with the foldable toy are identified in this document, the foldable toy advantageously can be formed virtually into an unlimited or infinite number of different shapes. This permits the child to use his or her imagination and sense of creativity in a virtually unlimited manner. It is believed that the unlimited nature of the foldable toy contributes to the toy's entertainment value since it has no boundaries and would not tend to bore children with a finite set of capabilities.

In addition to being entertaining, enjoyable and educational in its own right, the foldable toy of the present invention can also be used in conjunction with a game kit. Briefly, the kit includes the foldable toy and a game board defining at least one pathway that, at select locations, identifies a plurality of desired shapes. Children play the game by forming the desired shapes identified on the pathway with the foldable toy in order to progress along the pathway to complete the game. Among other advantages, the game kit requires the players to make the selected shapes displayed on the board throughout play of the game and thus expands the player's use and knowledge of the foldable toy as well as the shapes, such as letter and numerals, that the foldable toy can make. The game is also played in a social setting with other children, friends and family and thus fosters development of social skills.

In an embodiment, the foldable toy of the present invention comprises a plurality of primary links and a plurality of joints connecting the primary links together successively in end to end fashion. A plurality of secondary links each has a first end connected to one of the joints and extends outwardly to a second free end. The primary and secondary links can be rotated about joints in parallel planes so that the primary and secondary links can be selectively arranged to form a wide variety of different desired shapes.

The foldable toy includes a sufficient number of primary and secondary links in order to form a wide variety of shapes. This ability would include having a sufficient number of primary links to bring the links around to a touching fashion at one or more points. The foldable toy therefore preferably has at least six primary links and at least twelve secondary links. In an embodiment, the foldable toy advantageously includes twelve primary links connected by the joints and includes two secondary links per primary link for a total of twenty-four secondary links. While this embodiment is believed to be desirable in that it greatly facilitates the ability to form a vast variety of shapes, it will be understood by those skilled in the art that the number of primary links and secondary links can be varied considerably within the scope of this invention.

Each of the primary and secondary links is preferably rotatable about the joints through 360° in either direction and are each capable of being moved independently. The primary and secondary links also preferably make an audible clicking noise as they are each rotated about the joints to audibly inform the user of the rotation and also to make a noise that is generally amusing to children.

The foldable toy preferably is adapted to form certain desired shapes. These certain desired shapes include the letters of the English-language alphabet A, B, C, D, E, F, G, H, I, J, K, L, M, N, O, P, Q, R, S, T, U, V, W, X, Y, and Z. These desired shapes also preferably include at least the numerals 0, 1, 2, 3, 4, 5, 6, 7, 8, 9. By being designed to form such shapes, the foldable toy incorporates basic educational concepts important to a child's learning and development into playtime.

In an embodiment, the foldable toy is also capable of forming a plurality of common geometric shapes that facilitates the child's ability to identify and create such shapes. These common geometric shapes include at least a square, triangle, rectangle, star, diamond and octagon. It will be understood that the foldable toy can also be folded into other geometric shapes to facilitate learning and identification of such shapes.

In addition to the above-identified shapes, the foldable toy can be formed into a vast variety of shapes that can also be beneficial to a child's learning and development. For example, these additional shapes could include animals, buildings, devices, etc., in a virtually endless variety.

In an embodiment, the joints that connect the links consist of elements molded on the links as well as plug assemblies for connecting the links together. For example, the primary links may define apertures at its ends and the secondary links may define a similar aperture at its first end. A plug assembly is then inserted through the apertures in the respective primary and secondary links to permanently connect the links together in rotatable fashion.

In an embodiment, the apertures defined by the links each include a plurality of teeth and grooves about their inner circumference. The plug assembly then includes a plurality of flexibly resilient cantilevered fingers each aligned to engage the teeth and grooves on the respective links. The fingers engage the grooves on the apertures to secure the links in a selected position and are generally sufficiently resilient to hold the links in a selected position under the foldable toy's own weight. However, upon application of a sufficient force to the links, the fingers will bend and ride over the teeth to adjacent grooves until the fingers come to rest in a selected position groove to lock the links in a new selected position.

In an alternate embodiment, the primary links include apertures at its ends that have adjacent flexible fingers with a nub on the end. The secondary links are provided with a plurality of detents about the apertures at the first end of the links. The plug assembly also includes similar set of detents for positioning about the apertures on the links. The plug assembly locks the primary and secondary links together and the resilient fingers and nubs on the primary links engage the detents on the secondary links and plug assembly to lock the links in a selected position. Upon application of a force to the links, the primary or secondary links can be selectively rotated and the fingers and nubs on the primary links will ride over the detents on the secondary links and plug assembly until the nubs come to rest in a selected detent for placing the links in a selected position. Similar to the earlier embodiment, the fingers and nubs should be capable of engaging the detents to hold the links in a selected position under the weight of the foldable toy while still permitting rotational movement of the links upon application of a sufficient force.

The components of the foldable toy are preferably formed from a durable plastic material. For example, the plastic material may be polystyrene, abs, or any other similar plastic material. However, it will be understood that other materials could also be used within the scope of this invention.

The foldable toy may also be advantageously used in combination with a game kit. The game kit includes a game board including a pathway with a plurality of marked spaces. The marked spaces include at various locations a plurality of shapes that can be formed with the foldable toy. The kit also includes a timer, a die or dice, and a plurality of game pieces.

The players play the game by moving game pieces along the pathway on the game board by rolling the die or dice and the first player to move his or her game piece to the end of the pathway wins the game. During the progression along the pathway, the player's game piece will land on spaces showing a desired shape and the player is required to form the shape shown on the board with the foldable toy within an allotted time as measured by the timer, such as two minutes. If the player successfully makes the shown shape, such as a letter or numeral, to the satisfaction of the other players, the player then progress on the next turn. If the player does not, the player is once again required at the next turn to attempt to make the shown shape with the foldable toy within the allotted time.

Other objects, features and advantages of the present invention will become apparent from the following description and drawings.

BRIEF DESCRIPTION OF THE DRAWINGS

FIG. 1 is a perspective view of the foldable toy of the present invention.

FIG. 2 is a side view of the foldable toy of the present invention shown in its compact, folded-up position.

FIG. 3 is a front view illustrating the foldable toy of the present invention arranged to form the letter A.

FIG. 19 is a side exploded view of one embodiment of the joints of the foldable toy of the present invention.

FIG. 20 is a side exploded view of one of the joints of the foldable toy of the present invention.

FIG. 21a is a top plan view of an alternate embodiment of the primary links of the foldable toy of the present invention.

FIG. 21b is a side plan view of an alternate embodiment of the primary links of the foldable toy of the present invention.

FIG. 22a is a top plan view of an alternate embodiment of the secondary links of the foldable toy of the present invention.

FIG. 22b is a side plan view of an alternate embodiment of the secondary links of the foldable toy of the present invention.

FIG. 23a is a side cross sectional view showing an alternate embodiment of the joint connecting the primary and secondary links of the foldable toy of the present invention.

FIG. 23b is a perspective view of an alternate embodiment of a plug assembly for making the joints between the links of the foldable of the present invention.

FIG. 51 is a front view of the foldable toy arranged to form the numeral 2.

FIG. 52 is a front view of the foldable toy arranged to form the numeral 3.

FIG. 53 is a front view of the foldable toy arranged to form the numeral 4.

FIG. 54 is a front view of the foldable toy arranged to form the numeral 5.

FIG. 55 is a front view of the foldable toy arranged to form the numeral 6.

FIG. 56 is a front view of the foldable toy arranged to form the numeral 7.

FIG. 57 is a front view of the foldable toy arranged to form the numeral 8.

FIG. 58 is a front view of the foldable toy arranged to form the numeral 9.

FIG. 59 is a front view of the foldable toy arranged to form the numeral 10.

FIG. 60 is a front view of the foldable toy arranged to form the numeral 0 or a geometric shape of a circle.

FIG. 61 is a front view of the foldable toy arranged to form a geometric shape of a square.

FIG. 62 is a front view of the foldable toy arranged to form a geometric shape of a triangle.

FIG. 63 is a front view of the foldable toy arranged to form a geometric shape of a star.

FIG. 64 is a front view of the foldable toy arranged to form a geometric shape of a diamond.

FIG. 65 is a front view of the foldable toy arranged to form a geometric shape of a rectangle.

FIG. 66 is a front view of the foldable toy arranged to form a geometric shape of a octagon.

FIG. 67a is a schematic drawing of a hat.

FIG. 67b is a front view of the foldable toy arranged to form the shape of a hat.

FIG. 68a is a schematic drawing of a tree.

FIG. 68b is a front view of the foldable toy arranged to form the shape of a tree.

FIG. 69a is a schematic drawing of a turtle.

FIG. 69b is a front view of the foldable toy arranged to form the shape of a turtle.

FIG. 70a is a schematic drawing of a boat.

FIG. 70b is a front view of the foldable toy arranged to form the shape of a boat.

DESCRIPTION OF THE PREFERRED EMBODIMENTS

Figure 4:
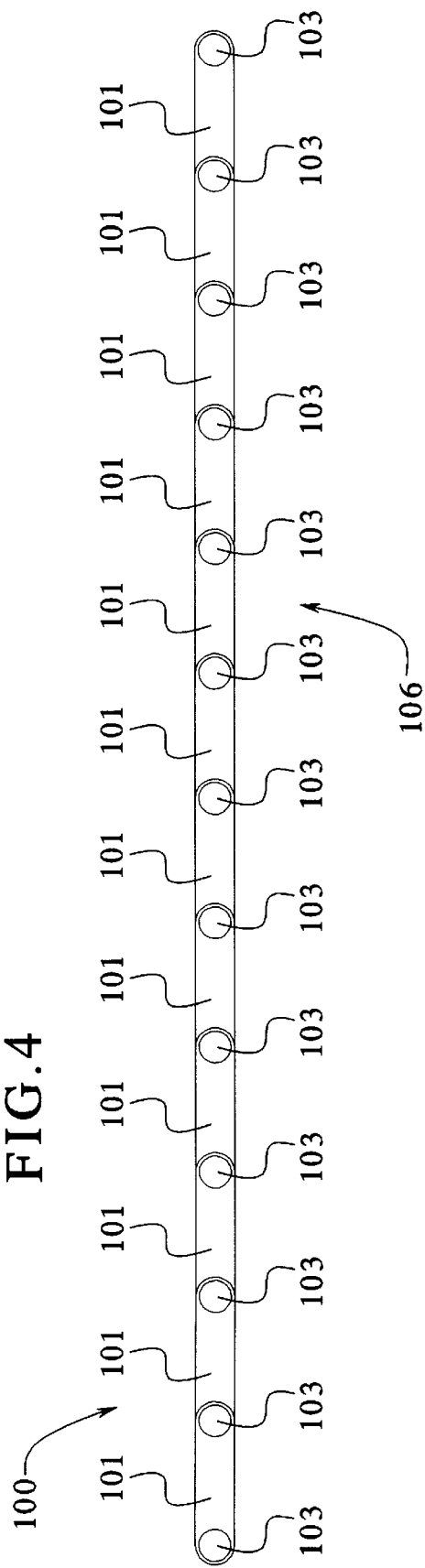
FIG. 4 is a top view of the foldable toy shown completely unfolded and elongated in a straight line.

Referring to the drawings, the numeral 100 generally designates the foldable toy of the present invention. The foldable toy 100 is generally comprised of a plurality of primary links 101, a plurality of secondary links 102, and a plurality of joints 103 pivotally connecting the primary links 101 and secondary links 102 together. The primary links 101 have a generally flat, elongated configuration in the form of a rectangle with rounded ends. The joints 103 connect the primary links 101 together in a successive end-to-end fashion. The secondary links 102 also have a generally flat, elongated rectangular configuration with rounded ends, including a first end 102a and a second end 102b. The first ends 102a of the secondary links 102 are connected to joints 103 and extend outwardly therefrom to the second free ends 102b.

The joints 103 permit the primary links 101 and secondary links 102 to rotate about the joints 103 in generally parallel planes. The primary and secondary links 101 and 102 can be selectively rotated about joints 103 and arranged to form a plurality of desired shapes.

FIG. 2 illustrates the foldable toy 100 folded into a compact shape 104 for easy storage and handling. In this position, each of the primary links 100 are vertically aligned over each other and are folded back and forth about joints 103 so that the joints 103 are also vertically aligned on each end. The secondary links 102 are each rotated about joints 103 to be vertically aligned underneath the primary links 101.

From the compact shape 104 shown in FIG. 2, the primary links 101 and secondary links 102 are rotated outwardly to selectively arrange the links 101 and 102 to form a desired shape. Both the primary links 101 and secondary links 102 are capable of being rotated through 360° about the joints 103 in either direction. Each of the primary and secondary links 101 and 102 are also independently positionable about the joints 103 to form the desired shape.

FIG. 3 presents a representative example of the foldable toy 100 being selectively arranged to show the desired shape of the letter A. Many other representative examples of desired shapes that can be formed with the foldable toy 100 are discussed throughout this application and shown in the drawings. However, it will be understood that the foldable toy 100 can be selectively arranged to form a virtually unlimited or infinite number of different desired shapes.

Figure 5:
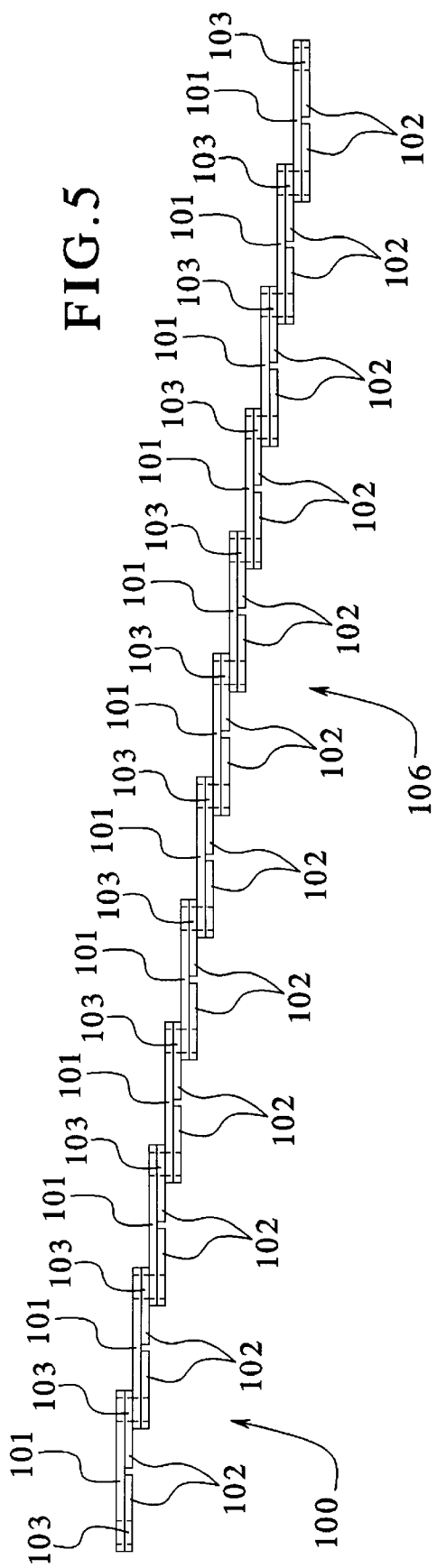
FIG. 5 is a side view of the foldable toy shown completely unfolded and elongated in a straight line.

Referring to FIGS. 4 and 5, the foldable toy 100 is in a completely unfolded shape 106 so that each of the primary links 101 is positioned in an end to end fashion along a linear path. The secondary links 102 are folded directly below the primary links 101 in FIG. 4 and thus cannot be seen from the top view. However, FIG. 5 shows that a pair of secondary links 102 are provided for each primary link 101 and are secured to the joints 103 for pivotable movement with respect to the primary links 101.

In order to permit the foldable toy 100 to be selectively arranged to form a wide variety of shapes, foldable toy 100 preferably includes at least six primary links 101 and at least twelve secondary links 102, with a pair of the secondary links 102 being associated with each one of the primary links 101. In the preferred embodiment shown in the drawings, the foldable toy 100 includes twelve primary links 101 and twenty-four secondary links 102 to advantageously permit the foldable toy 100 to be folded into a numerous variety of shapes. However, it will be understood by those skilled in the art that the number of primary and secondary links 101 and 102 can be varied considerably depending upon the particular application intended for the foldable toy 100.

Figure 6:
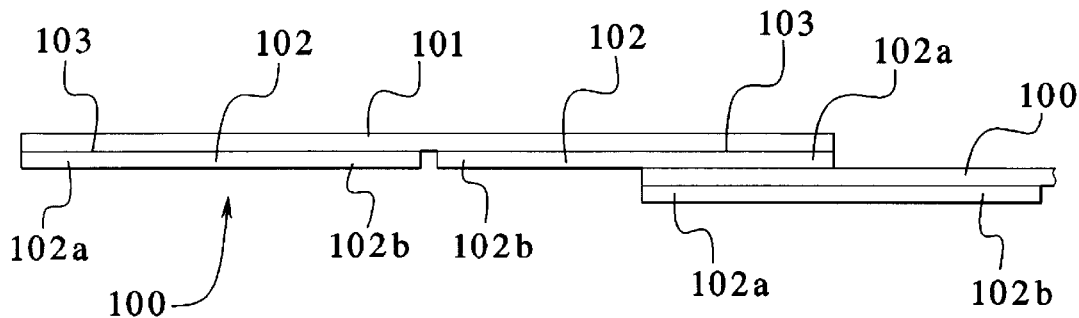
FIG. 6 is an enlarged side view showing one end of the foldable toy of the present invention.
Figure 7:
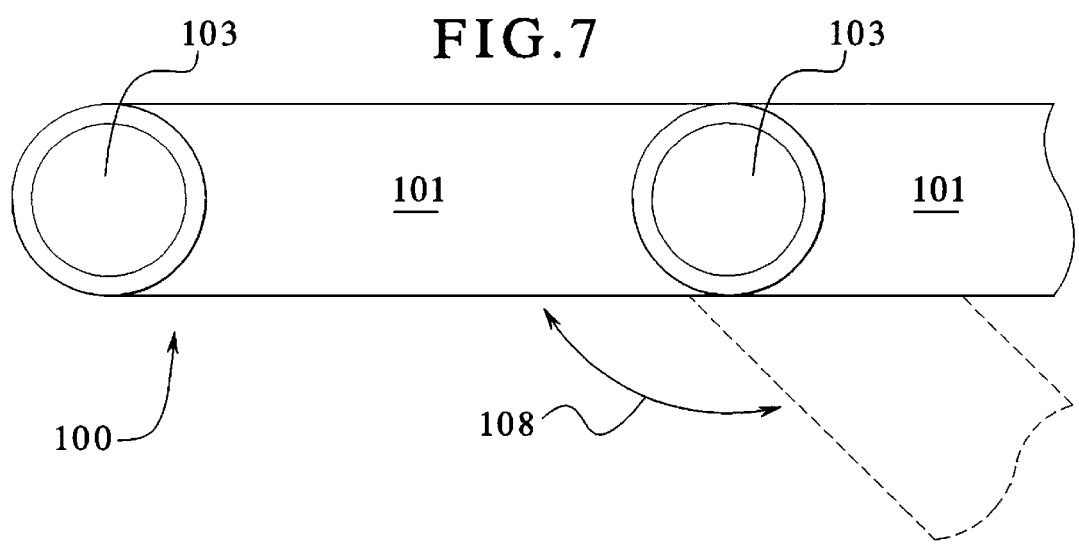
FIG. 7 is an enlarged top view showing one end of the foldable toy of the present invention.
Figure 8:
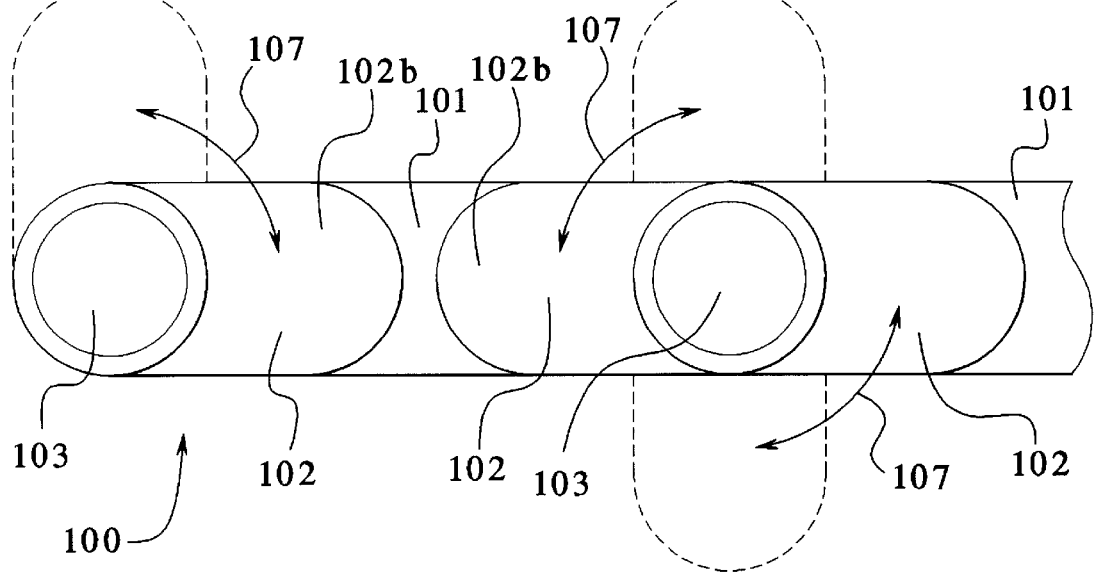
FIG. 8 is an enlarged bottom view showing one end of the foldable toy of the present invention.

FIGS. 6, 7 and 8 schematically illustrate the operation of the links at one end of the foldable toy 100. The secondary links 102 fit flat against the bottom of the respective primary links 101 as shown in FIG. 6 and are rotatable about the respective joints 103 as shown by arrows 107 in FIG. 8. The secondary links 102 that share a common joint 103 can be rotated independently of each other through 360° in either direction about the joint. The secondary link 102 on the other end of the primary link 101 can also be rotated in either direction through 360°. The secondary links 102 are each shorter than half of the length of the primary link 101 in order to permit full rotation of the secondary links without their second free ends 102b coming into contact or interfering with full rotation of the secondary links.

As shown in FIG. 7, each of the primary links 101 can be rotated as shown by arrow 108 through 360° in either direction about joints 103 independently of any rotation of the other primary links 101 or the secondary links 102.

FIGS. 9–20 illustrate one representative embodiment of the primary links 101, secondary links 102 and joints 103 in detail. The representative embodiment of the primary links 101, secondary links 102, and joints 103 is also discussed in considerable detail below in connection with FIGS. 9–20. However, it will be understood that the details of each of the components can be varied considerably within the scope of this invention.

Figure 9:
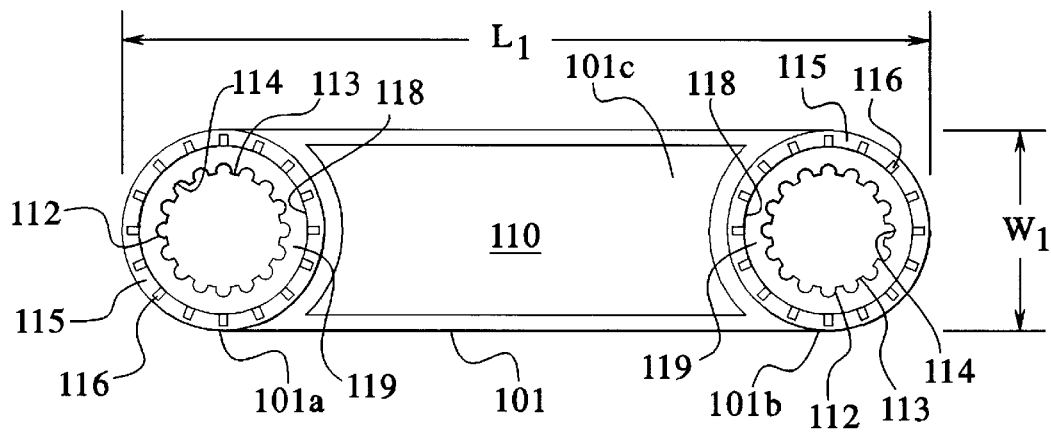
FIG. 9 is a top plan view of one of the primary links of the foldable toy of the present invention.
Figure 10:
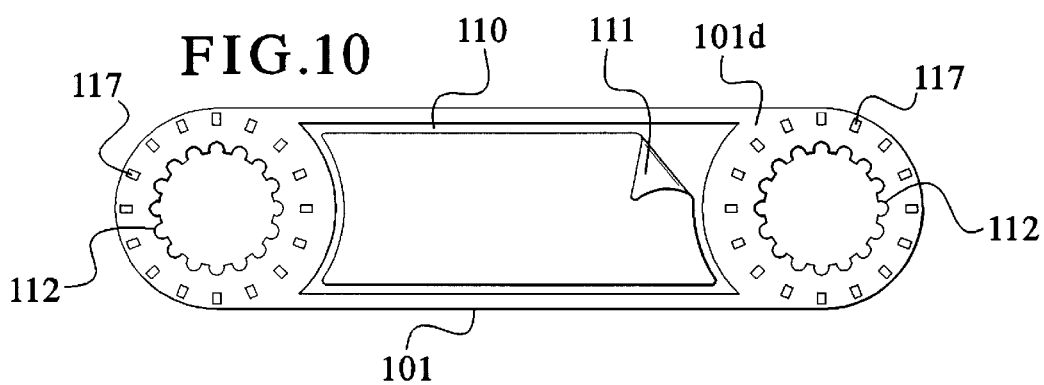
FIG. 10 is a bottom plan view of one of the primary links of the foldable toy of the present invention.
Figure 11:
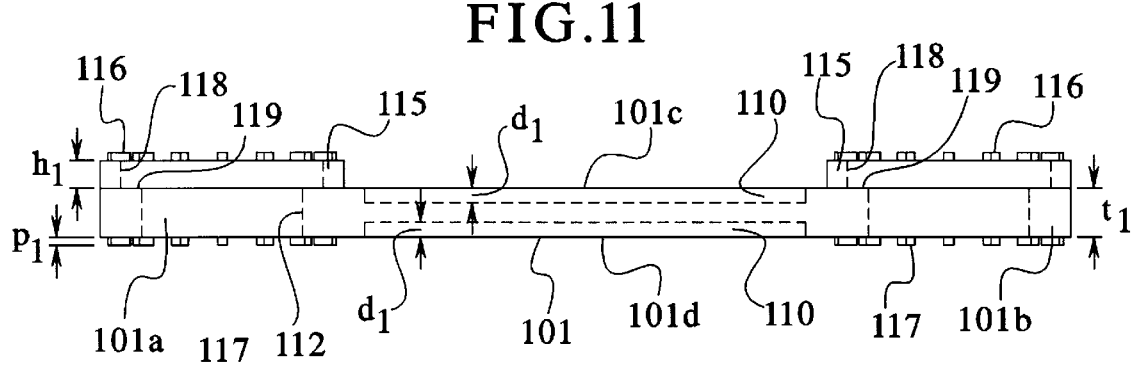
FIG. 11 is a side plan view of one of the primary links of the foldable toy of the present invention.

Referring to FIGS. 9,10 and 11, the primary link 101 includes first and second ends 101a and 101b and top and bottom faces 101c and 101d. The primary links 101 also generally have a length $L_1$ falling within a range of about 2 to 5 inches, a width $W_1$ falling within a range of about 0.5 to 1.5 inches and a thickness $T_1$ falling within a range of about 1/16 to 1/4 inches. In one particular embodiment, the primary link 101 has a length $L_1$ of about 4 5/8 inches, a width $W_1$ of about 1 1/8 inch, and a thickness $T_1$ of about 0.125 inches.

Figure 12:
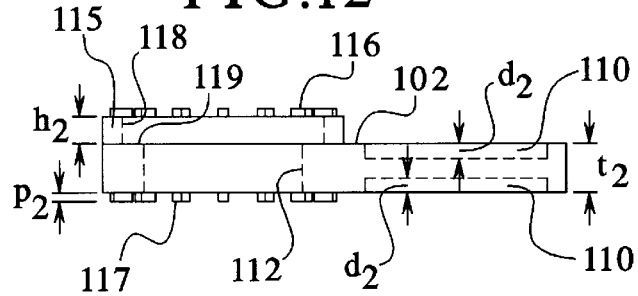
FIG. 12 is a side plan view of one of the secondary links of the foldable toy of the present invention.
Figure 13:
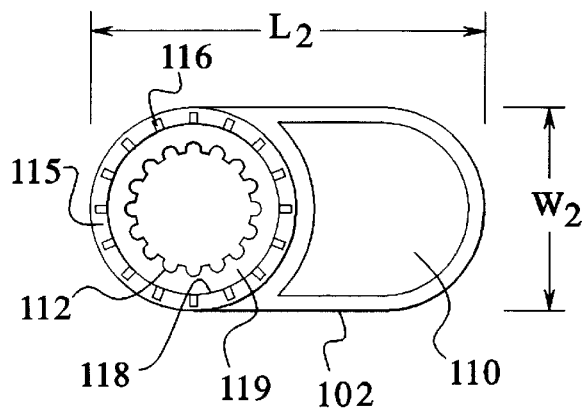
FIG. 13 is a top plan view of one of the secondary links of the foldable toy of the present invention.
Figure 14:
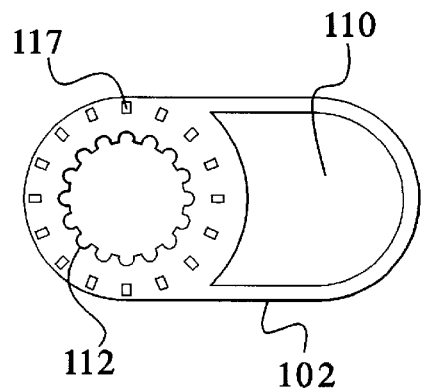
FIG. 14 is a bottom view of one of the secondary links of the foldable toy of the present invention.
Figure 15:
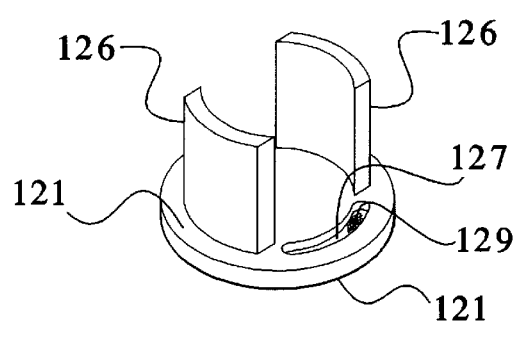
FIG. 15 is a perspective view showing one embodiment of a plug for use in the joints connecting the links of the foldable toy of the present invention.
Figure 16:
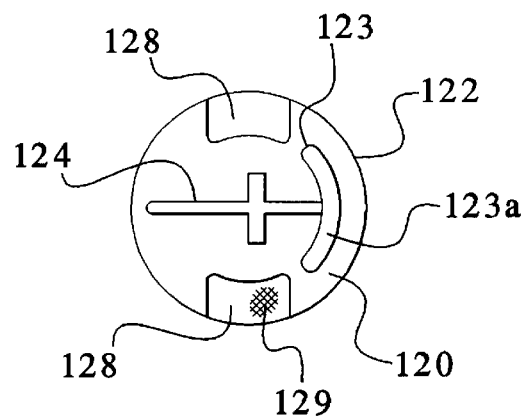
FIG. 16 is a bottom view showing one embodiment of a plug for use in the joints connecting the links of the foldable toy of the present invention.

Referring to FIGS. 12, 13 and 14, the secondary link 102 includes a first end 102a, a second free end 102b, a front face 102c and a bottom face 102d. The secondary link 102 has a length $L_2$ falling within a range of about 0.75 to 3 inches, a width W2 falling within a range of about 0.5 to 1.5 inches, and a thickness $t_2$ falling within a range of about 1/16 to 1/4 inches. In one particular embodiment, the secondary link 102 has a length $L_2$ of about 2.25 inches, a width $W_2$ of about 1.125 inches, and a thickness $t_2$ of about 0.125 inches.

The primary links 101 preferably all have uniform dimensions, length $L_1$, width $W_1$, and thickness $t_1$, within each foldable toy 100. This permits the primary links 101 to be positioned in vertical alignment above each other and also facilitates selectively arranging the links 101 to form a shape since each of the primary links 101 is of the same shape and size. The secondary links 102 also preferably have uniform dimensions, length $L_2$, width $W_2$, and thickness $t_2$, within each foldable toy 100. The length $L_2$ of the secondary links 102 is preferably less than half of the length $L_1$ of the primary links 101 so that the secondary links 102 can rotate about joints 103 under a common primary link 101 without interference between their free ends 102b.

While representative dimensions of the components of the foldable toy 100 have been given, as well as examples of one particular embodiment, it will be understood by those skilled in the art that the dimensions of the primary and secondary links 101 and 102 can be varied considerably depending upon the particular application for which the foldable toy 100 is intended. For example, the primary and secondary links 101 and 102 can be formed having relatively small dimensions for an application such as a placing the foldable toy 100 on a key chain. In contrast, the links 101 and 102 may have larger dimensions intended for forming free standing shapes for display on a surface or wall. In any event, the dimensions of the primary and secondary links 101 and 102 are each preferably uniform as described above.

As shown in the embodiments given in FIGS. 9–14, the primary links 101 and secondary links 102 include an inset 110 on the respective top and bottom faces 101c and 101d of the primary links 101 and the top and bottom faces 102c and 102d of the secondary links 102. The insets 110 preferably cover the central portions of the links 101 and 102 and have depths $D_1$ and $D_2$ of generally about 0.025 inches depending upon the thicknesses $T_1$ and $T_2$ of each of the links 101 and 102.

The insets 110 reduce the weight of the primary and secondary links 101 and 102 and thus reduce the overall weight of the foldable toy 100 to facilitate handling, carrying, and storing of the device. The insets 110 also permit a decal 111, shown in FIG. 10, to be placed on the links 101 and 102 without interfering with movement between the relative components. The decals 111 may be used to decorate the foldable toy 100 in a variety of colors or with a variety of designs. The decals 111 may also be used to place indicia on each of the links to facilitate the use of instructions for forming predetermined shapes with the foldable toy 100 as described in more detail hereinbelow.

FIGS. 19 and 20 illustrate exploded views of one embodiment of the joints 103 used to pivotly connect the primary links 101 and secondary links 102. In the embodiment given in FIGS. 9–20, the joints 103 are comprised of components formed on the links 101 and 102 and additional components for permanently securing each of the links together. The joints 103 preferably permit each of the primary links 101 and secondary links 102 to be rotated in either direction through 360° while still permitting the links 101 and 102 to stay in selected rotational positions in order to form desired shapes. The joints 103 also preferably make an audible clicking sound when any of the links 101 and 102 is rotated to indicate when rotation is started and stopped. The audible clicking sound also provides an additional amusement factor for children while playing with the foldable toy 100. It will be understood that a variety of different types of joints 103 could be used in the foldable 100 even though representative embodiments are shown in the drawings and described in more detail hereinbelow.

Referring to the embodiment of the joints 103 shown in FIGS. 9–20, the first and second ends 101a and 101b of the primary links 101 and the first end 102a of the secondary links 102 define apertures 112. Each of the apertures 112 defines a plurality of teeth 113 and grooves 114 about an inner periphery of the apertures 112. The apertures 112, teeth 113, and grooves 114 are uniformly sized and shaped for each of the primary and secondary links 101 and 102. The apertures 112 are also vertically aligned when the links are placed on top of each other.

The top surfaces 101c and 102d of the primary and secondary links 101 and 102 include collars 115 that surround the apertures 112. The collars 115 generally have heights $H_1$ and $H_2$ of about 1/16 of an inch in one specific embodiment. The collars 115 define an inner cylindrical opening 118 above a ledge 119 that leads to aperture 112. The cylindrical opening 118 and ledge 119 provide a space for receiving a mechanism for pivotly securing the links together as described in more detail hereinbelow.

The collars 115 also include a plurality of projections 116 around the circumference of the collar 115. Similarly, the bottom faces 101d and 102d of the links 101 and 102 include a plurality of projections 117 that encircle central apertures 112. The projections 116 and 117 generally have a height $P_1$ of about 0.01 inches in one specific embodiment. The collars 115 and projections 116 and 117 facilitate rotation of the links about the joints and placement in select positions as described in more detail hereinbelow.

Referring to FIG. 19, the joint 103 is shown connecting a single primary link 101 to a single secondary link 102 which occurs at the ends of the foldable toy 100. To form the joint 103, the bottom faces 101d and 102d of links 101 and 102 are placed flat against each other so that apertures 112 are aligned. A top and bottom plug 120 and 121 are then used to secure the two links 101 and 102 together.

The top plug 120 includes a head 122, a stem 123 and a plurality of cantilevered fingers 124. The stem 123 and fingers 124 pass through apertures 112 of the links 101 and 102 and the stem 123 is joined to a cap 125 of bottom plug 121. The bottom plug 121 also includes a pair of legs 126 that extend through apertures 112 and are connected to the head 122 of the other plug 120.

The fingers 124 are cantilevered and resiliently flexible to flex upon application of a force but have sufficient memory to return to their original position upon removal of the force. The top finger 124 engages the teeth 113 and grooves 114 about the periphery of aperture 112 of link 101 while the lower finger 124 engages the teeth 113 and grooves 114 about the periphery of aperture 112 of the secondary link 102. The flexible fingers 124 lock the respective links 101 and 102 in a selected position by engaging grooves 114 and the fingers 124 are sufficiently resilient to hold the links 101 and 102 in a selected position at least under the links own weight. When it is desired to rotate either of the links, the user provides a sufficient force to the selected link to cause the respective finger 124 to flex or bend and permit teeth 113 to slip past the finger so that the finger 124 adjusts to a sequential groove at the selected location. Generally, the fingers 124 should be sufficiently resilient to hold links 101 and 102 in a selected position at least under the foldable toy's own weight but should be sufficiently flexible to permit a child of about 2 to 3 years old to easily rotate links 101 and 102 to a selected position.

To further facilitate the links 101 and 102 ability to stay in a selected position, the projections 117 on the bottom faces of the links 101 and 102 interact to frictionally engage each other to further hold the links 101 and 102 in a selected position. However, upon application of a sufficient force, the projections 117 can be rotated over each other to permit the links 101 and 102 to be rotated to a new selected position. The projections 117 are spaced apart to engage each other in intervals. In an alternate embodiment, the projections 117 can be spaced close together to form alternating peaks and valleys in the form of serrations, such as found on poker chips, to facilitate interaction between the adjacent links. In any event, it will be understood that the spacing and height of the projections 117 (as well as projection 116) can be varied to obtain an optimum way of providing friction to hold the links in place while still permitting easy rotation.

FIG. 20 illustrates a similar joint 103 that rotatably connects two primary links 101 and two secondary links 102. As shown, the bottom faces 101d and 102d of each of the links 101 and 102 are placed flat against each other. In the middle of the assembly, the top face 102c of link 102 is positioned adjacent to the top face 101c of primary link 101. The apertures 112 of links 101 and 102 are all vertically aligned and a top and bottom plug 130 and 131 are used to secure the four links together.

The plugs 130 and 131 are similar to plugs 120 and 121 except that the components are extended in order to accommodate connection of four links. In particular, plug 130 includes a head 132, a stem 133 and a plurality of fingers 134. The plug 131 includes a head 135 and a pair of arms 136. The stem 133 of plug 130 passes through the four apertures 112 of the four links and is connected to the head 135 of plug 131. Conversely, the arms 136 of plug 131 extend through the four apertures that are connected to the head 132 of plug 130.

When assembled, the four fingers 134 are respectively positioned across from the teeth 113 and grooves 114 of the apertures 112 of the links 101 and 102. The fingers 134 are similar to fingers 124 and secure the links 101 and 102 in a selected position by engaging grooves 114 while still permitting rotation of links 101 and 102 upon application of a force sufficient to cause the fingers 134 to flex and move over teeth 113 to a selected groove 114 in the apertures 112 of the links.

Advantageously, the fingers 124 on plug 122 and the fingers 134 on plug 132 make a audible clicking noise upon rotation of any of the links 101 or 102. The fingers 124 and 134 click as they pass across the teeth and grooves 113 and 114 that circumscribe the apertures 112. The audible clicking noise signals the user when the links 101 or 102 are being effectively adjusted and also creates an amusing noise that children find enjoyable.

Similar to the joint 103 shown in FIG. 19, the projections 117 on the bottom faces 101d and 102d of links 101 and 102 frictionally engage each other to facilitate holding the links 101 and 102 in a selected position while still permitting relative rotation upon application of a sufficient force. Similarly, the projections 116 on top of collars 115 also frictionally engage each other at the interface between the central link 102 and central link 101 to facilitate holding the links in a selected position while still permitting relative rotation upon application of a sufficient force.

Once assembled, the collars 115 act to provide a slight space s vertically between the primary links 101 as shown in FIG. 2. By providing a space S, the collars 115 eliminate friction that could otherwise occur due to contact between the elongated middle portions of the links 101 and 102. Thus, the collars 115 concentrate the frictional forces for maintaining the links 101 and 102 in a selected position at the joints 163.

Once assembled, the head 122 of plug 120 fits within the aperture 118 defined by collar 115 and rests on ledge 119 of the primary link 101. Similarly, the head 125 of plug 121 fits within aperture 118 defined by collar 115 and rests on ledge 119 of the secondary link 102. In the joint 103 shown in FIG. 16, the head 132 of plug 130 and the head 135 of plug 131 also fit within the openings 118 defined by collars 115 and rest on ledges 119. In this manner, the heads of the respective plugs are flush with the collars 115 and do not interfere with the interaction between the components.

Figure 17:
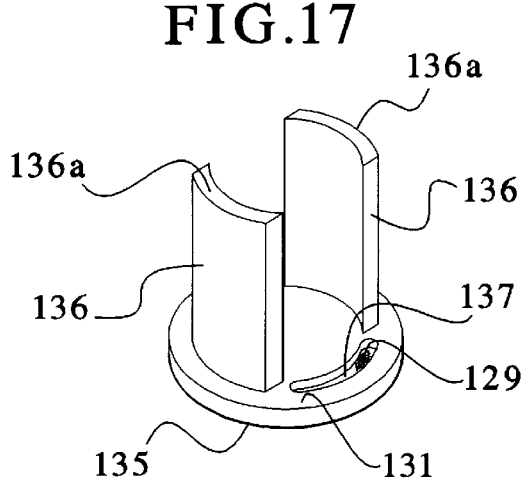
FIG. 17 is a perspective view showing one embodiment of a plug for use in the joints connecting the links of the foldable toy of the present invention.
Figure 18:
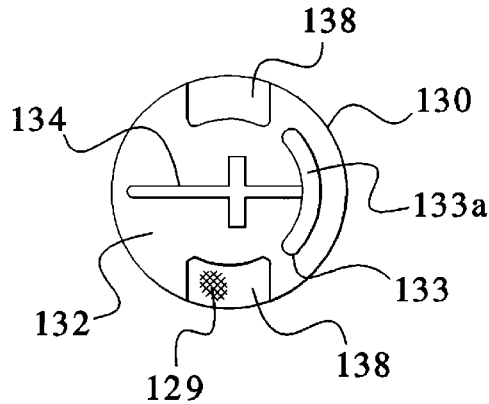
FIG. 18 is a bottom view showing one embodiment of a plug for use in the joints connecting the links of the foldable toy of the present invention.
Figure 24:
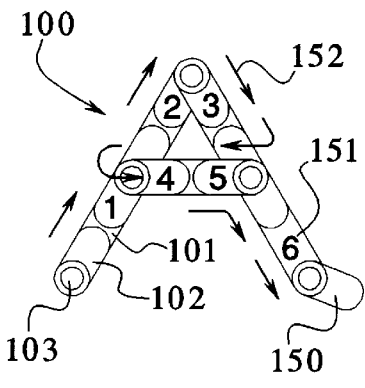
FIG. 24 is a front view of the foldable toy arranged to form the letter A.
Figure 25:
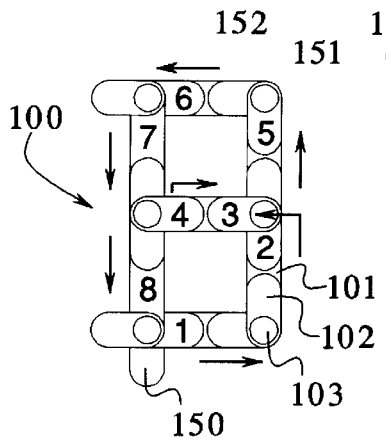
FIG. 25 is a front view of the foldable toy arranged to form the letter B.
Figure 26:
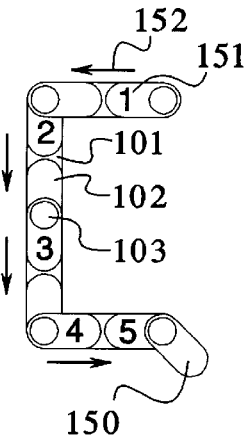
FIG. 26 is a front view of the foldable toy arranged to form the letter C.
Figure 27:
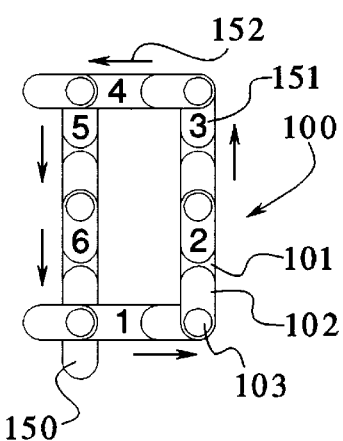
FIG. 27 is a front view of the foldable toy arranged to form the letter D.
Figure 28:
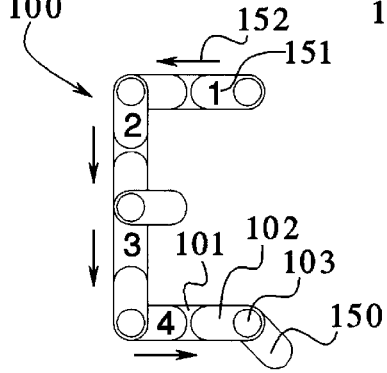
FIG. 28 is a front view of the foldable toy arranged to form the letter E.
Figure 29:
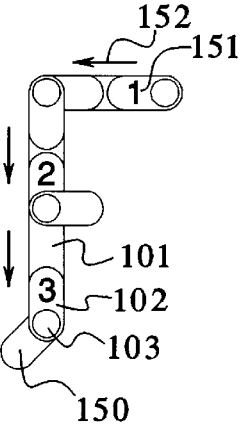
FIG. 29 is a front view of the foldable toy arranged to form the letter F.
Figure 30:
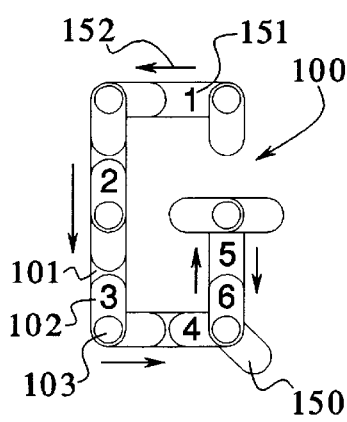
FIG. 30 is a front view of the foldable toy arranged to form the letter G.
Figure 31:
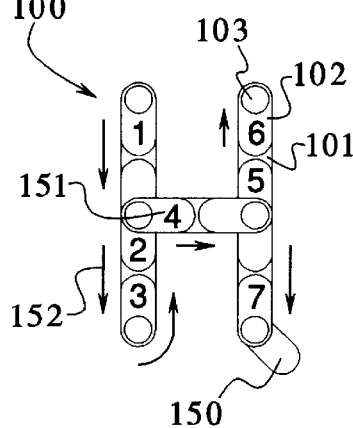
FIG. 31 is a front view of the foldable toy arranged to form the letter H.
Figure 32:
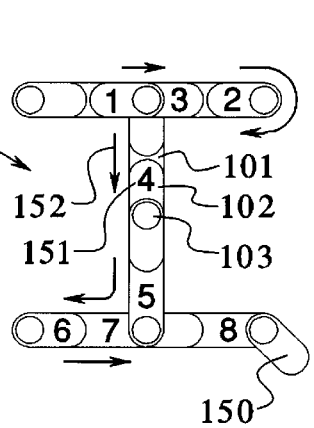
FIG. 32 is a front view of the foldable toy arranged to form the letter I.
Figure 33:
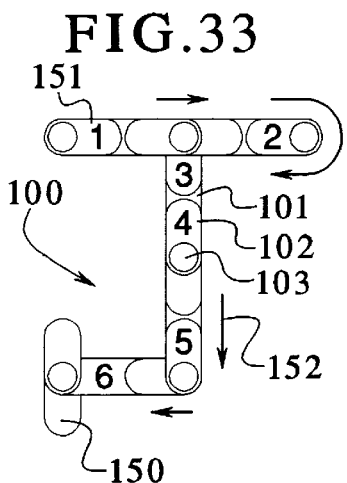
FIG. 33 is a front view of the foldable toy arranged to form the letter J.
Figure 34:
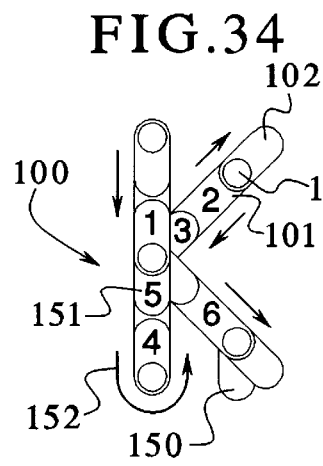
FIG. 34 is a front view of the foldable toy arranged to form the letter K.
Figure 35:
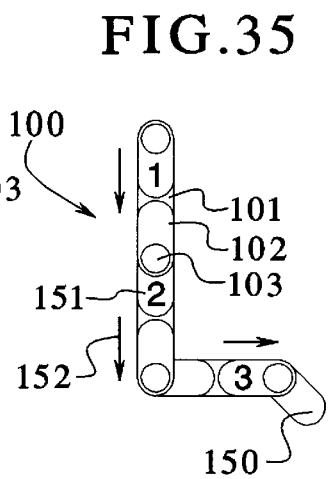
FIG. 35 is a front view of the foldable toy arranged to form the letter L.
Figure 36:
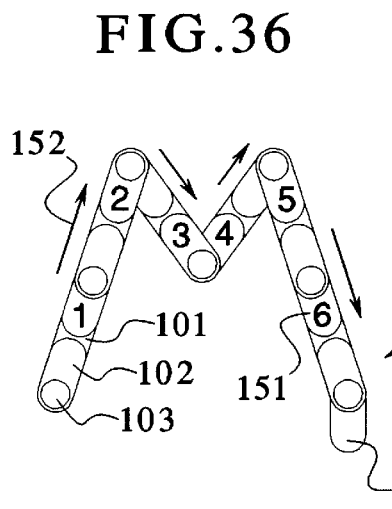
FIG. 36 is a front view of the foldable toy arranged to form the letter M.
Figure 37:
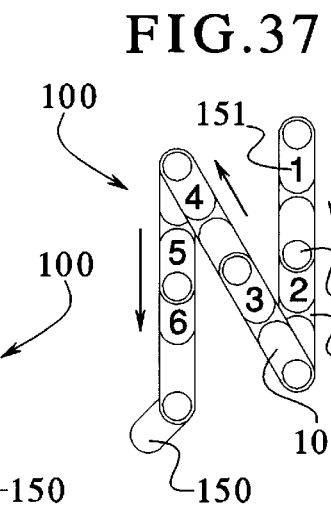
FIG. 37 is a front view of the foldable toy arranged to form the letter N.
Figure 38:
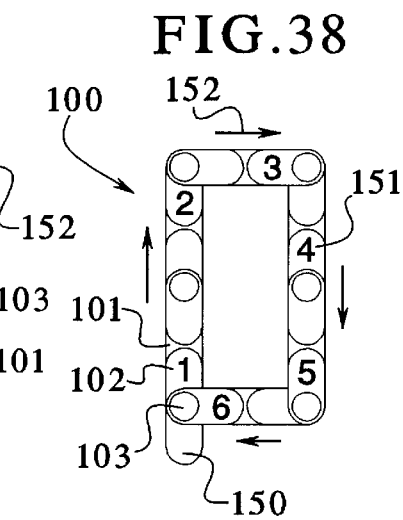
FIG. 38 is a front view of the foldable toy arranged to form the letter O.
Figure 39:
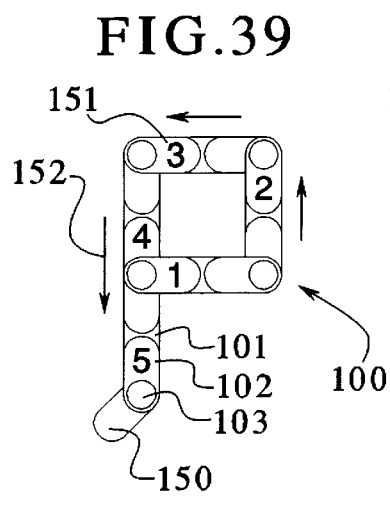
FIG. 39 is a front view of the foldable toy arranged to form the letter P.
Figure 40:
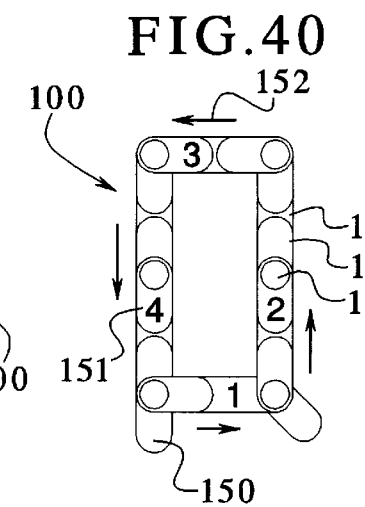
FIG. 40 is a front view of the foldable toy arranged to form the letter Q.
Figure 41:
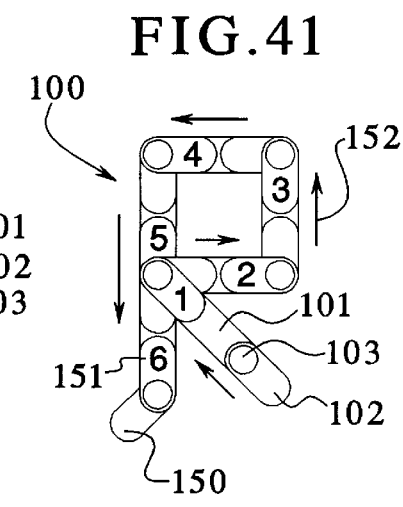
FIG. 41 is a front view of the foldable toy arranged to form the letter R.
Figure 42:
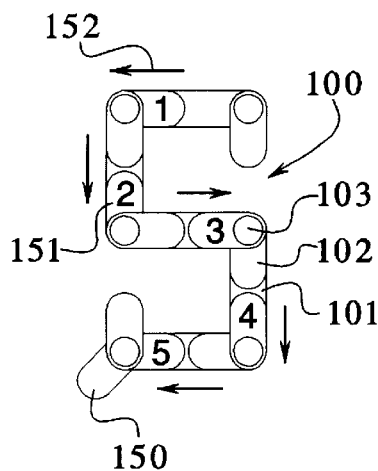
FIG. 42 is a front view of the foldable toy arranged to form the letter S.
Figure 43:
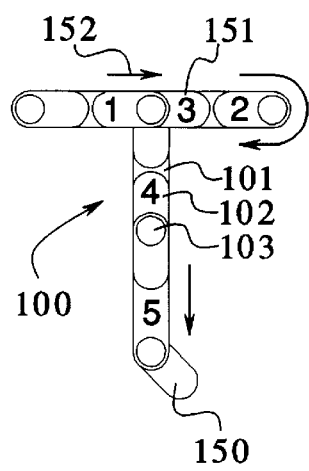
FIG. 43 is a front view of the foldable toy arranged to form the letter T.
Figure 44:
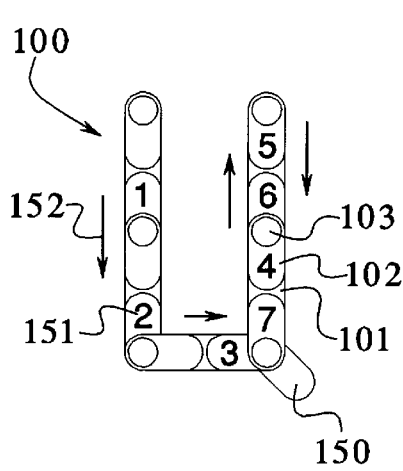
FIG. 44 is a front view of the foldable toy arranged to form the letter U.
Figure 45:
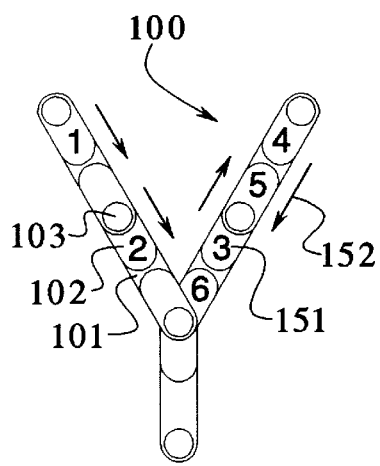
FIG. 45 is a front view of the foldable toy arranged to form the letter V.
Figure 46:
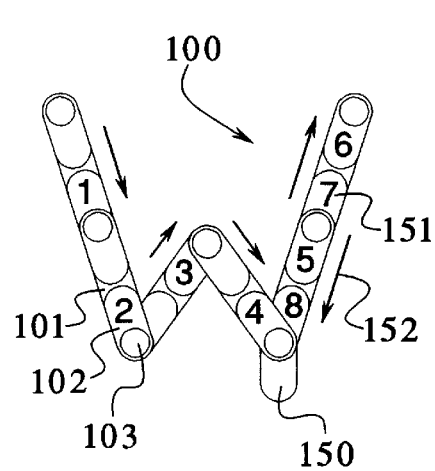
FIG. 46 is a front view of the foldable toy arranged to form the letter W.
Figure 47:
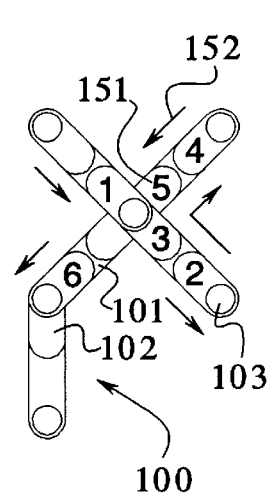
FIG. 47 is a front view of the foldable toy arranged to form the letter X.
Figure 48:
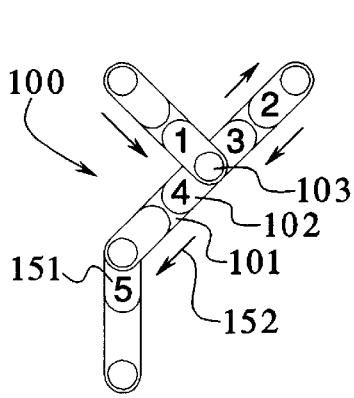
FIG. 48 is a front view of the foldable toy arranged to form the letter Y.
Figure 49:
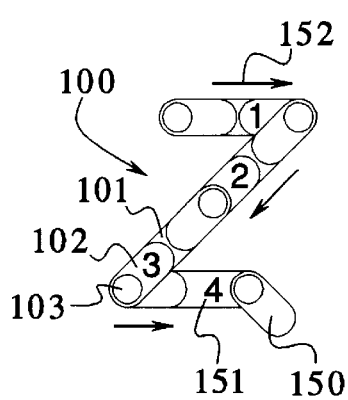
FIG. 49 is a front view of the foldable toy arranged to form the letter Z.
Figure 50:
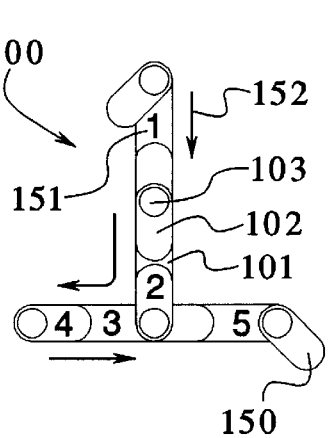
FIG. 50 is a front view of the foldable toy arranged to form the numeral 1.

FIGS. 15–18 illustrate the plugs 120, 121, 130,131 in more detail. Referring to FIGS. 17 and 18, plug 121 defines a recess 127 that receives a bottom edge 123a of stem 123 when the plugs are secured together through the apertures 112 in their respective links. Similarly, the head 122 of plug 120 includes a pair of recesses 128 that receive the tips 126a of arms 126 when the plugs are secured together. When the assembly is complete, the tip 123a can be secured to recess 127, and tips 126a can be secured to recesses 128, using a suitable adhesive 129, such as an epoxy glue or other suitable adhesive. In addition to adhesives, it is contemplated that sonic bonding or other welding processes could be used to join the components together.

Similar to plugs 120 and 121, plug 131 defines a recess 137 that receives a tip 133a of stem 133 and plug 130 defines a pair of recesses 138 that receive the tips 136a of arms 136 upon assembly. The components can likewise be joined using a suitable adhesive 129, such as an epoxy, or other joining method, such as sonic welding or bonding.

The links 101 and 102 are preferably formed of a durable plastic material. For example, the links 101 and 102 may be molded or otherwise manufactured from plastic materials such as polystyrene, abs or similar plastic materials. Similarly, the plugs 120, 121, 130 and 131 are preferably formed of a durable plastic material. The plugs may be formed of the same material as the links or, in some circumstances, may be formed of different materials in order to achieve desired resiliency in the fingers 124 and 134. In an embodiment, the links 101 and 102 as well as the plug assemblies were generally formed of polystyrene while the fingers 124 and 134 were formed of acetyl polycarbonate in order to make the fingers stiffer for controlling the rotation of the links. While it is believed that durable plastic materials are preferred for constructing the links and plugs, it will be understood by those skilled in the art that other materials could be used within the scope of this invention.

An example of an alternate embodiment of primary links 101', secondary links 102', and joints 103' is illustrated in FIGS. 21a–23b. In particular, and with reference to FIGS. 21a–23b, the links 101' comprise generally flat, elongated links defining a pair of apertures 112' at their ends. The secondary links 102' also have a generally flat, elongated construction, which is shorter than half the length of the primary links 101'. The links 102' also have an aperture 112' at the first end 102a' of the link and extend to a second free end 102b'. The primary links 101', secondary links 102', and joints 103' are constructed to form a foldable toy 100 as previously described herein.

In the embodiments shown in FIGS. 21a–23b, the primary links 101' define a pair of resilient and flexible fingers 140 that are cantilevered and extend adjacent to apertures 112'. The fingers 140 includes nubs 141 that project upwardly beyond the top and bottom surfaces 101c' and 101d' of the primary link 101'.

The secondary links 102' define a plurality of detents 142 around the circumference of apertures 112'. The detents 142 are sized to receive the nubs 141 on the fingers 140 of the primary links 101'.

FIG. 23b illustrates the plug assembly for connecting primary links 101' and secondary links 102' together and to form joints 103'. The plug assembly 143 includes a first plug half 144 including a base 145 and a stem 146. The other half of the plug assembly 143 is designated with the numeral 147 and comprises a base 148 that is connected to stem 146. Both of the bases 145 and 148 of plug assembly 143 define a plurality of detents 149 that form a circular pattern about the periphery of the central post 146. The detents 149 are similar to detents 142 on secondary links 102' and are sized to received the nubs 141 on fingers 140 of the primary links 101'.

FIG. 23a shows an assembled joint 103' joining the primary links 101' and secondary links 102' so that they can rotate through 360° in either direction about the joint 103'. As shown, the nubs 141 on fingers 140 of the primary links 101' ride over and in the detents 149 on the plug assembly 143 and the detents 142 on the secondary links 102'. The interaction between the resilient fingers 140, nubs 141 and detents 142 and 149 lock the links 101' and 102' in a selected position while still permitting the links 101' and 102' to be independently and freely rotated about joints 103 upon application of a sufficient force. Similar to the earlier described embodiments, the resiliency of the fingers 140 and the construction of the nubs 141 and detents 142, 149 should provide sufficient frictional force to hold the links 101' and 102' in selected positions so that the foldable toy 100 can hold a selected shape under its own weight while still permitting a child of approximately 2 to 3 years of age to easily rotate any of the links 101' or 102' to a selected position.

In FIGS. 9–20 and FIGS. 21a–23a, different embodiments of the links and joints have been shown for purposes of illustration of the present invention. However, it will be understood that the details of the construction of the links and the joints can be considerably varied within the scope of this invention in order to form a foldable toy 100.

As shown in FIGS. 24–49, the foldable toy 100 can be selectively arranged so that the primary links 101 and secondary links 102 are rotated about joints 103 to form a plurality of desired shapes, including each of the twenty-six characters or letters of the English-language alphabet. In particular, FIGS. 24–49 each respectively show the foldable toy 100 being selectively arranged to form the letters A, B, C, D, E, F, G, H, I, J, K, L, M, N, O, P, Q, R, S, T, U, V, W, X, Y, and Z. The ability of the foldable toy 100 to form each of the twenty-six letters of the English-language alphabet is important since it permits learning the full range of letters in the alphabet and thus increases the educational value. While representative examples of forming each of the letters of the English-language alphabet are shown in FIGS. 24–49, it will be understood that the foldable toy 100 can be folded in a variety of ways to form representative examples of the letters of the English-language alphabet or of other alphabets.

In forming each of the letters of the alphabet or other shapes, one of the primary links 101 or secondary links 102 can be folded outward from the general shape to form a handle 150 as designated in each of FIGS. 24–49 (and in other figures). The handle 150 permits the user to hold up the shape by the handle 150 without covering a part of the desired shape so that the shape can be easily displayed to others, which can be important in connection with playing certain games with the foldable toy 100 as described in more detail hereinbelow.

In the drawings, the links are shown being marked with indicia 151 that select links within the foldable toy 100 can be identified. The indicia 151 may be printed directly on the links or may be placed on the links using decals 111. The indicia 151 are helpful for using an instruction manual on how to form the foldable toy into desired shapes. For example, an instruction manual could include drawings, such as shown in the figures, showing the indicia 151 identifying the individual links and having arrows 152 showing the appropriate directions to rotate the links 101 and 102 about joints 103 in order to form a desired shape. In the embodiment shown in the drawings, the indicia 151 comprise numerals that are sequentially placed on the links but it is understood that other identifiers could easily be used.

In addition to forming the letters of the alphabet, the foldable toy 100 is also capable of being selectively arranged to form a plurality of numerals including the numerals 0, 1, 2, 3, 4, 5, 6, 7, 8, 9 and 10 as shown in FIGS. 50–60. Similar to the letters of the alphabet, the foldable toy 100 can be folded by selectively arranging the primary links 101 and secondary links 102 by rotatable movement about joints 103 in the directions of the arrows 152 in order to form each of the numerals as shown in FIGS. 50–60. The ability of the foldable toy 100 to make each of the numerals 0 through 9 is also important since it permits learning of a full range of numbers and thus provides an educational benefit.

The foldable toy 100 can also be selectively arranged to form a plurality of common geometric shapes. While FIG. 60 can be interpreted as the numeral 0, FIG. 60 can also represent the shape of a circle. Similarly, FIGS. 61–66 respectively show the toy 100 selectively arranged to represent the desired geometric shape of a square, a triangle, a star, a diamond, a rectangle, and an octagon. Each of the shapes formed by foldable toy 100 in FIGS. 60–66 can be formed to include a handle 150 and can also include indicia 151 to facilitate making of the shapes. FIGS. 60–66 also include arrows 152 for generally showing the direction of folding the foldable toy 100 to make to each of the desired shapes.

In additional to letters, numbers, and common geometric shapes, the foldable toy 100 can be folded into virtually unlimited number of different shapes. Additional examples of desired shapes are shown both schematically and with the foldable toy 100 in FIGS. 67a–78b. In these figures, the shapes can be formed to include a handle 150, can include indicia 151 for facilitating the making of each of the shapes, and the shapes can generally be formed by following arrows 152.

In particular, FIG. 67a includes a schematic drawing of a hat and FIG. 67b shows the foldable toy 100 selectively arranged to form the shape of a hat.

FIG. 68a graphically shows a tree while FIG. 68b shows the foldable toy 100 selectively arranged to form the shape of a tree.

FIG. 69a schematically illustrates a turtle while FIG. 69b shows the foldable toy 100 selectively arranged to form the shape of a turtle.

FIG. 70a schematically shows the shape of a boat while FIG. 70b shows the foldable toy 100 selectively arranged to form the shape of a boat.

Figure 71A:
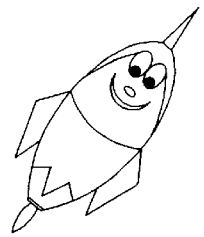
FIG. 71a is a schematic drawing of a rocket ship.
Figure 71B:
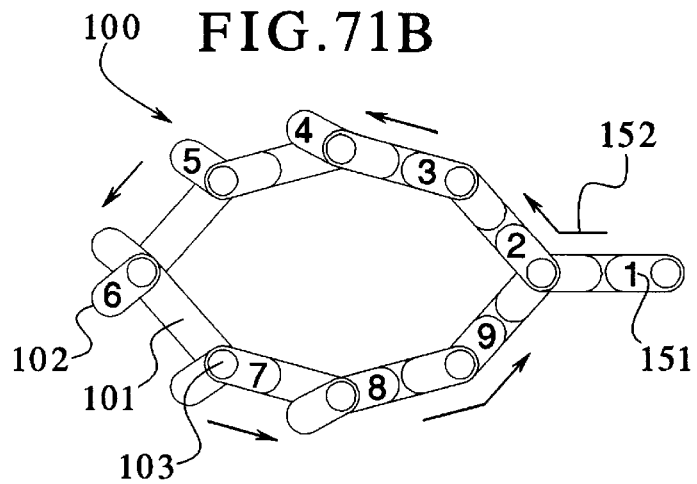
FIG. 71b is a front view of the foldable toy arranged to form the shape of a rocket ship.

FIG. 71a schematically shows the shape of a rocket ship while FIG. 71b shows the foldable toy 100 selectively arranged to form the shape of a rocket ship.

Figure 72A:
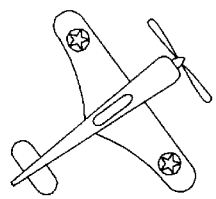
FIG. 72a is a schematic drawing of an airplane.
Figure 72B:
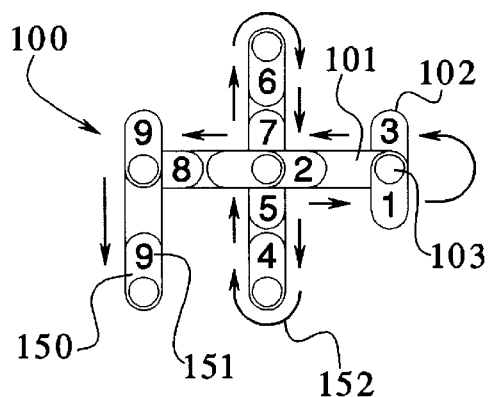
FIG. 72b is a front view of the foldable toy arranged to form the shape of an airplane.

FIG. 72a schematically shows the shape of an airplane while FIG. 72b shows the foldable toy 100 selectively arranged to form the shape of an airplane.

Figure 73A:
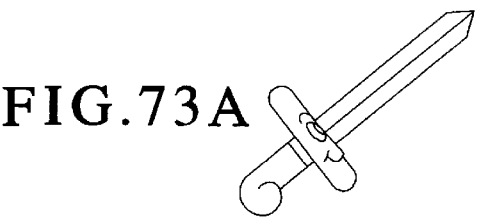
FIG. 73a is a schematic drawing of a sword.
Figure 73B:
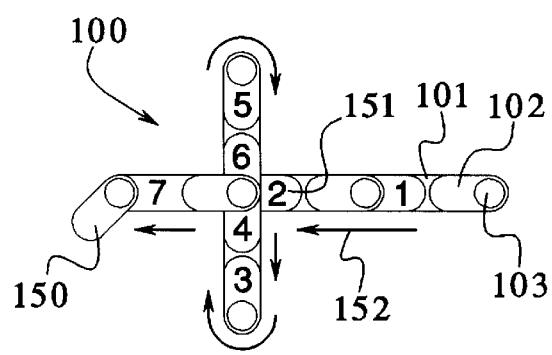
FIG. 73b is a front view of the foldable toy arranged to form the shape of a sword.

FIG. 73a schematically shows the shape of a sword while FIG. 73b shows the foldable toy 100 selectively arranged to form the shape of a sword.

Figure 74A:
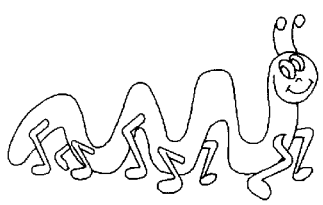
FIG. 74a is a schematic drawing of a centipede.
Figure 74B:
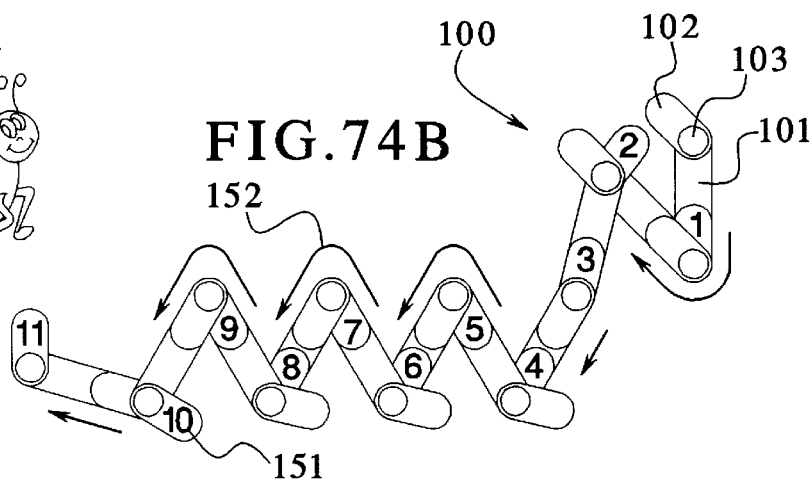
FIG. 74b is a front view of the foldable toy arranged to form the shape of a centipede.

FIG. 74a schematically shows the shape of a centipede while FIG. 74b shows the foldable toy 100 selectively arranged to form the shape of a centipede.

Figure 75A:
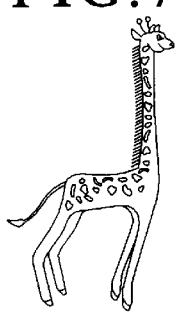
FIG. 75a is a schematic drawing of a giraffe.
Figure 75B:
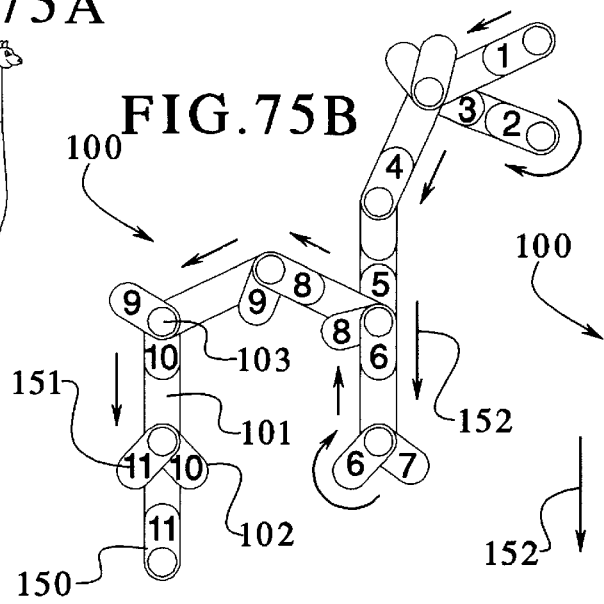
FIG. 75b is a front view of the foldable toy arranged to form the shape of a giraffe.

FIG. 75a schematically shows the shape of a giraffe while FIG. 75b shows the foldable toy 100 selectively arranged to form the shape of a giraffe.

Figure 76B:
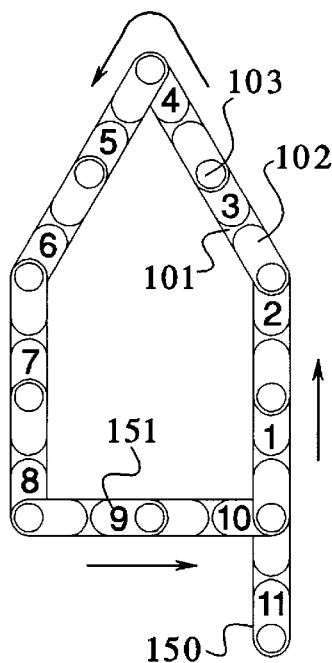
FIG. 76b is a front view of the foldable toy arranged to form the shape of a house.
Figure 76A:
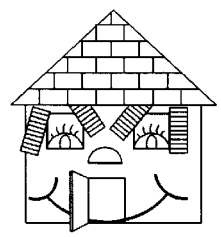
FIG. 76a is a schematic drawing of a house.

FIG. 76a schematically shows the shape of a house while FIG. 76b shows the foldable toy 100 selectively arranged to form the shape of a house.

Figure 77A:
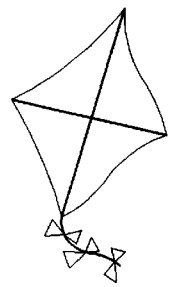
FIG. 77a is a schematic drawing of a kite.
Figure 77B:
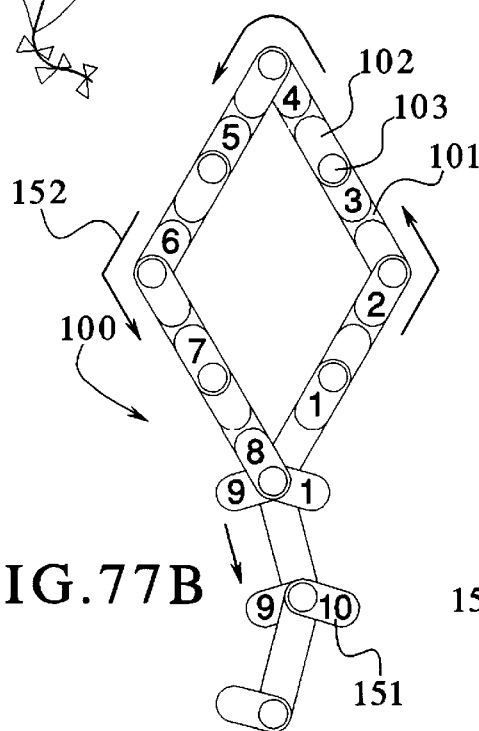
FIG. 77b is a front view of the foldable toy arranged to form the shape of a kite.

FIG. 77a schematically shows the shape of a kite while FIG. 77b shows the foldable toy 100 selectively arranged to form the shape of a kite.

Figure 78A:
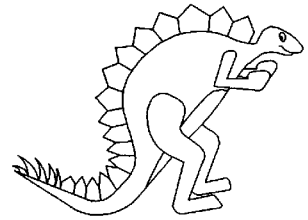
FIG. 78a is a schematic drawing of a dinosaur.
Figure 78B:
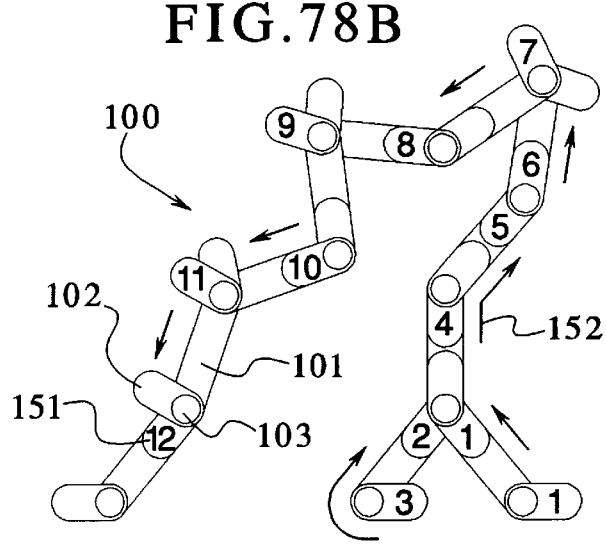
FIG. 78b is a front view of the foldable toy arranged to form the shape of a dinosaur.

FIG. 78a schematically shows the shape of a dinosaur while FIG. 78b shows the foldable toy 100 selectively arranged to form the shape of a dinosaur.

Figure 79:
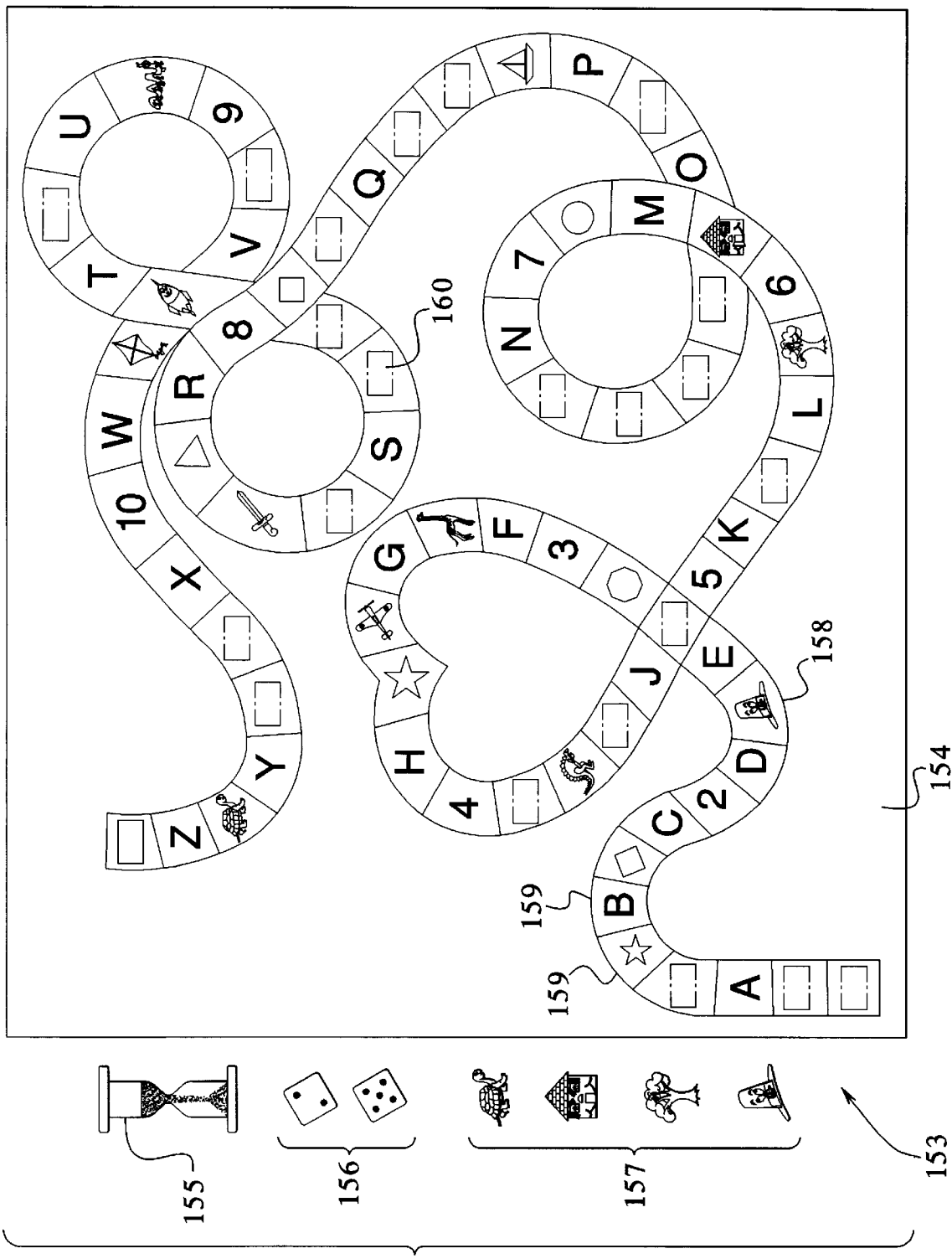
FIG. 79 is a top plan view of a game board and other game pieces for use with the foldable toy of the present invention.

The foldable toy 100 can be combined with a game kit 153 shown in FIG. 79. The game kit 153 includes a game board 154, a timer 155, a die or pair of dice 156 (as shown), and a plurality of game pieces 157. The game board 154 defines a pathway 158 comprised of a plurality of individually marked spaces 159. Some of the spaces 159 include drawings showing a plurality of shapes that can be made with the foldable toy 100. In the embodiment given in the drawings, the pathway 158 is shown displaying in the spaces 159 each of the twenty-six letters of the English-language alphabet, the numerals 2–10, a plurality of geometric shapes and a plurality of additional shapes. The pathway 158 and marked spaces 159 may include other indicia 160, such as a space indicating that the user should take a play card.

The game kit 153 and foldable toy 100 can be used in a variety of ways but an illustrative example of playing a game will be described herein. In particular, each of the players of the game can be provided with a game piece 157 for progressing along pathway 158 by rolling a die or dice 156. Upon landing on one of these spaces 159 displaying a shape, the players would be required to make the designated shape with the foldable toy 100 within the time allotted by timer 155 in order to progress to the next turn. The player would be required to remain in that space until the player could make the designated shape within the allotted time. For example, timer 155 could provide a time limit of two minutes. Players would each take turns rolling the die or dice 156, making shapes with the foldable toy 100 and progressing along pathway 158. The first player to reach the end of the pathway 158 would win the game.

It is believed that using the foldable toy 100 in connection with the game kit 153 is particularly advantageous because it fosters interaction between other children, family and friends and thus facilitates social skills. In addition, the predesignated shapes on the pathway 158 require the players to learn the different shapes displayed on the pathway 158 and learn how to use the foldable toy 100 to form these shapes. This reinforces learning of each of the shapes, which may include letters, numbers, geometric shapes, and other shapes that facilitate a child's learning and development.

Although modifications and changes may be suggested by those skilled in the art, it is the intention of the inventor to embody within the patent warranted hereon all changes and modifications as reasonably and properly come within the scope of his contribution to the art.

We claim:

1. A foldable toy comprising:
   a plurality of primary links;
   a plurality of joints connecting said plurality of primary links;
   a plurality of secondary links each having a first end connected to one of said plurality of joints and extending to a second free end, a pair of said secondary links being associated with each of said plurality of primary links; and
   said plurality of joints permitting said primary links and said secondary links to rotate about said joints so that said primary links and said secondary links can be selectively arranged to form a plurality of desired shapes.

2. The toy of claim 1 in which said primary links and said secondary links are rotatable about said joints in parallel planes.

3. The toy of claim 1 in which said primary links and said secondary links are independently rotatable about said joints through 360° in either direction.

4. The toy of claim 1 in which rotation of each of said primary links and said secondary links rotated about said joints makes an audible clicking noise.

5. The toy of claim 1 in which said desired shapes include at least the letters A, B, C, D, E, F, G, H, I, J, K, L, M, N, O, P, Q, R, S, T, U, V, W, X, Y, and Z.

6. The toy of claim 1 in which said desired shapes include at least the numerals 0, 1, 2, 3, 4, 5, 6, 7, 8, and 9.

7. The toy of claim 1 in which said desired shapes include at least the letters A, B, C, D, E, F, G, H, I, J, K, L, M, N, O, P, Q, R, S, T, U, V, W, X, Y, and Z and at least the numerals 0, 1, 2, 3, 4, 5, 6, 7, 8 and 9.

8. The toy of claim 1 in which said desired shapes include a plurality of geometric shapes including at least a square, triangle, rectangle, star, diamond and octagon.

9. The toy of claim 1 in which said foldable toy includes at least 6 primary links and at least 12 secondary links.

10. The toy of claim 1 in which said foldable toy includes 12 primary links and 24 secondary links.

11. The toy of claim 1 in which said primary links have a generally flat elongated rectangular configuration and said secondary links have a generally flat elongated rectangular configuration.

12. The toy of claim 11 in which said primary links and said secondary links have rounded ends.

13. The toy of claim 1 in which said primary links have a first length and said secondary links have a second length, said second length of said secondary links being less than half of said first length of said primary links.

14. A foldable toy comprising:
    a plurality of primary links;
    a plurality of joints connecting said plurality of primary links;
    a plurality of secondary links each having a first end connected to one of said plurality of joints and extending to a second free end; and
    said plurality of joints permitting said primary links and said secondary links to rotate about said joints so that said primary links and said secondary links can be selectively arranged to form a plurality of desired shapes, said primary links include top and bottom faces that define insets.

15. The toy of claim 14 in which said secondary links include top and bottom faces that define insets.

16. The toy of claim 15 in which at least one decal is placed on at least one of the insets on said primary links and said secondary links.

17. A foldable toy comprising:
    a plurality of primary links;
    a plurality of joints connecting said plurality of primary links;
    a plurality of secondary links each having a first end connected to one of said plurality of joints and extending to a second free end;
    said plurality of joints permitting said primary links and said secondary links to rotate about said joints so that said primary links and said secondary links can be selectively arranged to form a plurality of desired shapes;
    each of said primary links including a first and second end and each of said ends defining an aperture;
    each of said secondary links defining an aperture at said first end;

said joints including a plug assembly that passes through said apertures of said primary links and said secondary links to connect said primary links together in successive end-to-end fashion and connect said first ends of said secondary links to said joints, said apertures in said primary and secondary links each defining a plurality of teeth and grooves and said plug assembly including resilient flexible fingers positioned to engage said teeth and grooves as said links are rotated about said joints.

18. The toy of claim 17 in which said fingers are sufficiently resilient to engage said grooves of said apertures in said links to hold said links in a selected position while still permitting rotation of said links about said joints upon application of a sufficient force to resiliently bend said fingers and permit said rotation.

19. The toy of claim 17 in which said primary links include collars that surround said apertures and said secondary links include a collar that surrounds said aperture in said first end of said secondary links.

20. The toy of claim 19 in which said collars define openings above a ledge, and said plug assembly for connecting the links includes heads that are received in said openings on said ledges so that said heads are flush with said collars.

21. The toy of claim 19 in which a plurality of projections are provided around said collars on said primary and secondary links for providing frictional engagement between adjacent ones of said primary and secondary links in said foldable toy.

22. The toy of claim 21 in which said primary and secondary links include bottom surfaces and a plurality of projections are provided about said apertures for providing frictional engagement between adjacent ones of said primary and secondary links in said foldable toy.

23. A foldable toy comprising:
a plurality of primary links;
a plurality of joints connecting said plurality of primary links;
a plurality of secondary links each having a first end connected to one of said plurality of joints and extending to a second free end; and
said plurality of joints permitting said primary links and said secondary links to rotate about said joints so that said primary links and said secondary links can be selectively arranged to form a plurality of desired shapes, said primary links including apertures at said first and second ends and a pair of resilient fingers positioned adjacent to said apertures, each of said fingers including a nub that projects beyond an upper and lower face of said primary link, said secondary links include an aperture at said first ends and a plurality of detents circumscribing said aperture, said joints including a plug assembly having a top and bottom base, a post extending between said top and bottom bases and through said apertures in the first and secondary links, and a plurality of detents on said bases about said post, whereby, said fingers and nubs on said primary links are adapted to frictionally engage said detents on said plug assembly and said secondary links in order to lock said links in selected positions while still permitting rotational movement of said links upon application of a sufficient force.

24. A foldable toy capable of being selectively arranged to form a plurality of different desired shapes, said toy comprising:
a plurality of primary links each having a generally flat, elongated body and a pair of ends;
a plurality of secondary links each having a generally flat, elongated body and a first end and a second end;
a plurality of joints rotatably connecting said primary links together and connecting said first ends of said plurality of secondary links to said primary links, said joints permitting independent rotational movement of said primary and secondary links through 360° in either direction about said joints in order to selectively form a desired shape; and
a plurality of resilient cantilevered fingers housed within each of said joints and positioned to engage said links during rotation in order to make an audible clicking noise.

25. The toy of claim 24 in which said primary links and said secondary links are rotatable about said joints in parallel planes.

26. The toy of claim 24 in which rotation of each of said primary links and said secondary links about said joints makes an audible clicking noise.

27. The toy of claim 24 in which said desired shapes include at least the letters A, B, C, D, E, F, G, H, I, J, K, L, M, N, O, P, Q, R, S, T, U, V, W, X, Y, and Z.

28. The toy of claim 24 in which said desired shapes include at least the numerals 0, 1, 2, 3, 4, 5, 6, 7, 8, and 9.

29. The toy of claim 24 in which said desired shapes include a plurality of geometric shapes including at least a square, triangle, rectangle, star, diamond and octagon.

30. The toy of claim 24 in which said foldable toy includes 12 primary links and 24 secondary links.

31. The toy of claim 24 in which said primary links have a first length and said secondary links have a second length, said second length of said secondary links being less than half of said first length of said primary links.

32. A foldable toy capable of being selectively arranged to form a plurality of different desired shapes, said toy comprising:
a plurality of primary links each having a generally flat, elongated body and a pair of ends;
a plurality of secondary links each having a generally flat, elongated body and a first end and a second end;
a plurality of joints rotatably connecting said primary links together and connecting said first ends of said plurality of secondary links to said primary links, said joints permitting independent rotational movement of said primary and secondary links through 360° in either direction about said joints in order to selectively form a desired shape, said primary links each including top and bottom faces that define insets and said secondary links including top and bottom faces that define insets, and in which decals are placed in some of said inserts.

33. A foldable toy comprising:
a plurality of flat links;
a plurality of joints connecting said plurality of flat links and permitting rotation of said links about said joints in parallel planes through 360° in either direction in order to form a plurality of different desired shapes; and
a plurality of resilient cantilevered fingers housed within each of said joints and positioned to engage said links during rotation in order to make an audible clicking noise.

34. The toy of claim 33 in which said desired shapes includes at least each of the letters A, B, C, D, E, F, G, H, I, J, K, L, M, N, O, P, Q, R, S, T, U, V, W, X, Y, and Z, and includes at least the numerals 0, 1, 2, 3, 4, 5, 6, 7, 8, and 9.

35. The toy of claim 34 in which said desired shapes further include a plurality of geometric shapes including at least a square, triangle, rectangle, star, diamond and octagon.

36. The toy of claim 33 in which said plurality of flat links includes primary links and secondary links, said secondary links being shorter in length than said primary links.

37. The toy of claim 36 in which said joints connects the primary links together in successive end to end fashion and connect a first end of said secondary links to said primary links while opposite second ends of said secondary links are free ends unconnected to the joints, a pair of secondary links being associated with each of said primary links.

38. The toy of claim 37 in which said foldable toy includes twelve of said primary links and includes twenty-four of said secondary links.

39. A game comprising:
- a game board having at least one pathway of marked spaces with some of said marked spaces including images of a plurality of desired shapes;
- a plurality of game pieces for moving along said pathway; and
- a foldable toy which can be folded into each of said plurality of desired shapes.

40. The game of claim 39 further including one or more dice for rolling by game players to determine a number of spaces to move said game pieces along said pathway.

41. The game of claim 39 further including a timer for providing game players with a time limit in which to selectively arrange said foldable toy to form one of said plurality of desired shapes when a player's game piece lands on one of said marked spaces showing said one of said plurality of desired shapes during play of the game.

42. The game of claim 37 in which said plurality of desired shapes includes at least the letters A, B, C, D, E, F, G, H, I, J, K, L, M, N, O, P, Q, R, S, T, U, V, W, X, Y, and Z.

43. The game of claim 39 in which said plurality of desired shapes includes at least the numerals 0, 1, 2, 3, 4, 5, 6, 7, 8 and 9.

44. The game of claim 39 in which said plurality of desired shapes includes at least the geometric shapes including a square, triangle, rectangle, star, diamond and octagon.

45. The game of claim 39 in which said foldable toy includes 12 primary links and 24 secondary links.

46. The game of claim 39 in which said primary links have a generally flat elongated rectangular configuration and said secondary links have a generally flat elongated rectangular configuration.

47. The game of claim 39 in which said primary links have a first length and said secondary links have a second length, said second length of said secondary links being less than half of said first link of said primary links, and a pair of secondary links being associated with each of said primary links.

48. The game of claim 39 in which said primary links include a first and second ends and each of said ends defines an aperture, and the first end of the secondary links define an aperture.

49. The game of claim 39 in which said joints include plugs that pass through said apertures of said primary links and said secondary links to connect said primary links together in successive end-to-end fashion and connect said first ends of said secondary links to said joints.

50. The game of claim 49 in which apertures in said primary and secondary links define a plurality of teeth and grooves and said plugs include resilient flexible fingers positioned to engage said teeth and grooves as said links are rotated about said joints.

51. The game of claim 50 in which said fingers are sufficiently resilient to engage said grooves of said apertures in said links to hold said links in a selected position while still permitting said rotation of said links about said joints upon application of a sufficient force to said links to cause said fingers to resiliently bend and permit said rotation.

52. The game of claim 42 in which said foldable toy comprises:
- a plurality of primary links;
- a plurality of joints connecting said plurality of primary links;
- a plurality of secondary links each having a first end connected to one of said plurality of joints and extending to a second free end; and
- said plurality of joints permitting said primary links and said secondary links to rotate about said joints so that said primary links and secondary links can be selectively arranged to form said plurality of desired shapes.

53. The game of claim 52 in which said primary links and said secondary links are rotatable about said joints in parallel planes.

54. The game of claim 52 in which said primary links and said secondary links are independently rotatable about said joints through 360° in either direction.

55. The game of claim 52 in which each of said primary links and said secondary links make an audible clicking noise when rotated about said joints.

56. The game of claim 52 in which said foldable toy includes at least 6 primary links and at least 12 secondary links.

* * * * *